United States Patent
Wang

(10) Patent No.: US 12,549,713 B2
(45) Date of Patent: *Feb. 10, 2026

(54) RECOVERY POINT SIGNALING IN VIDEO CODING

(71) Applicant: Huawei Technologies Co., Ltd., Shenzhen (CN)

(72) Inventor: Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/747,629

(22) Filed: Jun. 19, 2024

(65) Prior Publication Data

US 2024/0340410 A1    Oct. 10, 2024

Related U.S. Application Data

(63) Continuation of application No. 17/520,348, filed on Nov. 5, 2021, now Pat. No. 12,022,064, which is a
(Continued)

(51) Int. Cl.
*H04N 19/107* (2014.01)
*H04N 19/105* (2014.01)
(Continued)

(52) U.S. Cl.
CPC ......... *H04N 19/107* (2014.11); *H04N 19/105* (2014.11); *H04N 19/159* (2014.11);
(Continued)

(58) Field of Classification Search
CPC .. H04N 19/107; H04N 19/105; H04N 19/159; H04N 19/172; H04N 19/46; H04N 19/70
(Continued)

(56) References Cited

U.S. PATENT DOCUMENTS 9,998,757 B2    6/2018 Chen
2004/0190606 A1    9/2004 Deshpande
(Continued)

FOREIGN PATENT DOCUMENTS

JP    2017507517 A    3/2017

OTHER PUBLICATIONS

"Series H: Audiovisual and Multimedia Systems Infrastructure of audiovisual services—Coding of moving video, High efficiency video coding," Recommendation ITU-T H.265, Apr. 2013, 5 pages.
(Continued)

*Primary Examiner* — Nguyen T Truong
(74) *Attorney, Agent, or Firm* — Conley Rose, P.C.

(57) ABSTRACT

A video coding mechanism is disclosed. The mechanism includes receiving a bitstream comprising a gradual decoding refresh (GDR) picture, a recovery point picture following the GDR picture in decoding order, and a header associated with the GDR picture. The header includes a picture order count (POC) least significant bit (LSB) value coded prior to a recovery POC value. A POC for the GDR picture is determined based on the POC LSB value. The recovery POC value is determined based on the POC for the GDR picture. The recovery POC value indicates a POC for the recovery point picture. The bitstream is decoded according to GDR based on the GDR picture and the recovery point picture.

18 Claims, 12 Drawing Sheets

Related U.S. Application Data continuation of application No. PCT/US2020/030641, filed on Apr. 30, 2020.

(60) Provisional application No. 62/843,999, filed on May 6, 2019.

(51) Int. Cl.
*H04N 19/159* (2014.01)
*H04N 19/172* (2014.01)
*H04N 19/46* (2014.01)
*H04N 19/70* (2014.01)

(52) U.S. Cl.
CPC .......... *H04N 19/172* (2014.11); *H04N 19/46* (2014.11); *H04N 19/70* (2014.11)

(58) Field of Classification Search
USPC .................................................. 375/240.02
See application file for complete search history.

(56) References Cited

U.S. PATENT DOCUMENTS

| | | |
|---|---|---|
| 2013/0170561 A1 | 7/2013 | Hannuksela |
| 2014/0079138 A1 | 3/2014 | Auyeung |
| 2014/0192897 A1 | 7/2014 | Wang |
| 2014/0198857 A1 | 7/2014 | Deshpande |
| 2015/0181233 A1 | 6/2015 | Ramasubramonian et al. |

OTHER PUBLICATIONS

Document: JVET-N0115-v1, Hendry et al., "AHG14/AHG17: GDR—Gradual decoding refresh," Joint Video Experts Team (JVET) of ITU-T SG 16 WP 3 and ISO/IEC JTC 1/SC 29/WG 11 14th Meeting: Geneva, CH, Mar. 19-27, 2019, 21 pages.

Document: JVET-O0152-v1, Wang, Y.K. "AHG17: HRD support for GRA and changing the term GRA to GDR," Joint Video Experts Team (JVET) of ITU-T SG 16 WP 3 and ISO/IEC JTC 1/SC 29/WG 11 15th Meeting: Gothenburg, SE, Jul. 3-12, 2019, 7 pages.

Document: JVET-O0151-v1, Wang, Y.K., "AHG17: On no_output_of_prior_pics_flag," Joint Video Experts Team (JVET) of ITU-T SG 16 WP 3 and ISO/IEC JTC 1/SC 29/WG 11 15th Meeting: Gothenburg, SE, Jul. 3-12, 2019, 6 pages.

Document: JVET-N0077, Kazui, K., "Hypothetical Reference Decoder in VVC," Joint Video Experts Team (JVET) of ITU-T SG 16 WP 3 and ISO/IEC JTC 1/SC 29/WG 11, 14th Meeting: Geneva, CH, Mar. 19-27, 2019, 3 pages.

"Advanced Video Coding for Generic Audiovisual Services," Series H: Audiovisual and Multimedia Systems Infrastructure of Audiovisual Services—Coding of Moving Video, ITU-T H.264, Jun. 2019, 836 pages.

"High Efficiency Video Coding," Series H: Audiovisual and Multimedia Systems Infrastructure of Audiovisual Services—Coding of Moving Video, ITU-T H.265, Dec. 2016, 664 pages.

"Line Transmission of Non-Telephone Signals, Video Codec for Audiovisual Services at p×64 kbits," ITU-T Recommendation H.261, Mar. 3, 1993, 29 pages.

"Transmission of Non-Telephone Signals, Information Technology—Generic Coding of Moving Pictures and Associated Audio Information: Video," ITU-T H.262, Jul. 1995, 211 pages.

"Video Coding for Low Bit Rate Communication," Series H: Audiovisual and Multimedia Systems Infrastructure of Audiovisual Services—Coding of Moving Video, ITU-T H.263, Jan. 2005, 226 pages.

Bross, et al., "Versatile Video Coding (Draft 5)," Document: JVET-N1001-v3, Joint Video Experts Team (JVET) of ITU-T SG 16 WP 3 and ISO/IEC JTC 1/SC 29/WG 11, 14th Meeting: Geneva, CH, Mar. 19-27, 2019, 371 pages.

JVET-L0160, "AHG14: Intra Refresh Test conditions and Anchors generation Proposal," Joint Video Experts Team (JVET) of ITU-T SG 16 WP 3 and ISO/IEC JTC 1/SC 29/WG 11, 12th Meeting: Macao, CN, Oct. 3-12, 2018, 3 pages.

JVET-K0212-v1, "Improved Cyclic Intra Refresh," Joint Video Experts Team (JVET) of ITU-T SG 16 WP 3 and ISO/IEC JTC 1/SC 29/WG 11, 11th Meeting: Ljubljana, SI, Jul. 10-18, 2018, 4 pages.

JVET-M0529-v1, "AHG14: Normative Recovery Point Indication," Joint Video Experts Team (JVET) of ITU-T SG 16 WP 3 and ISO/IEC JTC 1/SC 29/WG 11, 14th Meeting: Marrakesh, MA, Jan. 9-18, 2019, 8 pages.

Document: JVET-N0115, Hendry, F., et al., "AHG1 4/AHG17: GDR—gradual decoding refresh", Joint Video Experts Team (JVET) of ITU-T SG 16 WP 3 and ISO/IEC 1/SC 29/WG 11, 14th Meeting: Geneva, CH, Mar. 19-27, 2019, XP030202639, pp. 1-5.

Document: JVET-O0198-v1, Chen, L., et al., "AHG9: On picture header dependency", Joint Video Experts Team (JVET) of ITU-T SG 16 WP 3 and ISO/IEC 1/SC 29/WG 11, 17th Meeting: Brussels, BE, XP030222876, Jan. 7-17, 2020, 8 pages.

Document: JVET-P2001-v4, Benjamin Bross et al., "Versatile Video Coding (Draft 7)," Joint Video Experts Team (JVET) Document of ITU-T SG 16 WP 3 and ISO/IEC JTC 1/SC 29/WG 11 16th Meeting: Geneva, CH, Oct. 1-11, 2019, total 456 pages, XP030218450.

"Series H: Audiovisual and Multimedia Systems Infrastru cture of audiovisual services-Coding of moving video, High efficiency video coding," Recommendation ITU-T H. 265, Feb. 2018, total 692 pages.

RECOVERY POINT SIGNALING IN VIDEO CODING

CROSS-REFERENCE TO RELATED APPLICATIONS

This patent application is a continuation of U.S. Nonprovisional application Ser. No. 17/520,348 filed on Nov. 5, 2021 by Ye-Kui Wang and titled "Recovery Point Signaling In Video Coding," which claims the benefit of International Application No. PCT/US2020/030641, filed Apr. 30, 2020 by Ye-Kui Wang, and titled "Recovery Point Signaling In Video Coding," and U.S. Provisional Patent Application No. 62/843,999, filed May 6, 2019 by Ye-Kui Wang, and titled "Hypothetical Reference Decoder For Gradual Random Access," which are hereby incorporated by reference.

TECHNICAL FIELD

The present disclosure is generally related to video coding, and is specifically related to improvements to allow a hypothetical reference decoder to support gradual decoding refresh in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in a decoder, the method comprising: receiving, by a receiver of the decoder, a bitstream comprising a gradual decoding refresh (GDR) picture, a recovery point picture following the GDR picture in decoding order, and a header associated with the GDR picture, the header including a picture order count (POC) least significant bit (LSB) value coded prior to a recovery picture order count value; determining, by a processor of the decoder, a POC for the GDR picture based on the POC LSB value; determining, by the processor, a recovery point picture POC based on the POC for the GDR picture and the recovery picture order count value; decoding, by the processor, the bitstream according to GDR based on the GDR picture and the recovery point picture POC; and forwarding, by the processor, one or more pictures following the recovery point picture for display as part of a decoded video sequence.

GDR is a mechanism for coding a bitstream. A GDR picture includes a vertical region on intra-prediction coded video data and one or more vertical regions of inter-prediction coded video data. The location of the intra-prediction coded region moves over a series of related pictures creating a clean region. Pictures that include a clean region code such clean region using only intra-prediction data or inter-prediction data that references a clean region of another picture. The result is that a decoder can begin decoding a bitstream at a first GDR picture and decode each picture in order. Once the last picture prior to a recovery point is reached, the decoder becomes synchronized and can decode any further pictures by using inter-prediction based on clean usable data. Video coding systems may signal picture order counts of relevant pictures in headers, such as picture/slice headers. Such signaling may include a recovery picture order count value that indicates a difference between the POC of the GDR picture and the POC of the recovery point picture. However, a decoder should determine a POC of the GDR picture in order to determine the POC of the recovery point picture. The present example includes a POC LSB value for the GDR picture. The GDR POC LSB value is included in a header along with the recovery POC value. Further, the GDR POC LSB value is coded into the header prior to the recovery POC value. In this way, the decoder can parse the GDR POC LSB value prior to parsing the recovery POC value. As such, the recovery POC value can be derived immediately rather than being placed in memory to be resolved once the POC for the GDR picture is determined. As such, the present disclosure reduces processor and/or memory resource usage at an encoder and/or a decoder.

Optionally, in any of the preceding aspects, another implementation of the aspect provides, wherein the header associated with the GDR picture is a picture header.

Optionally, in any of the preceding aspects, another implementation of the aspect provides, wherein the POC LBS value is included in the header as a ph_pic_order_cnt_lsb value, and wherein the ph_pic_order_cnt_lsb value specifies a picture order count modulo maximum picture order count LSB for a current picture where the GDR picture is the current picture.

Optionally, in any of the preceding aspects, another implementation of the aspect provides, wherein the recovery picture order count value is included in the header as a recovery_poc_cnt value, and wherein the recovery_poc_cnt value specifies a recovery point of decoded pictures in output order.

Optionally, in any of the preceding aspects, another implementation of the aspect provides, wherein a no output of prior pictures flag is set in the header when a current picture is the GDR picture.

Optionally, in any of the preceding aspects, another implementation of the aspect provides, wherein the GDR picture includes a region coded according to inter-prediction and a region coded according to intra-prediction.

Optionally, in any of the preceding aspects, another implementation of the aspect provides, wherein the GDR picture is contained in a GDR access unit (AU), wherein the bitstream further comprises a buffering period (BP) supplemental enhancement information (SEI) message associated with the GDR AU, and wherein the BP SEI message provides an initial coded picture buffer (CPB) removal delay for initialization of a hypothetical reference decoder (HRD) at a position of the GDR AU in decoding order.

In an embodiment, the disclosure includes a method implemented in an encoder, the method comprising: encoding into a bitstream, by a processor of the encoder, a GDR picture and a recovery point picture following the GDR picture in decoding order; determining, by the processor, a POC LSB value of the GDR picture and a recovery picture order count value of the recovery point picture; encoding into the bitstream, by the processor, a header associated with the GDR picture, the header including the POC LSB value coded prior to the recovery picture order count value; and storing, by a memory coupled to the processor, the bitstream for communication toward a decoder.

GDR is a mechanism for coding a bitstream. A GDR picture includes a vertical region on intra-prediction coded video data and one or more vertical regions of inter-prediction coded video data. The location of the intra-prediction coded region moves over a series of related pictures creating a clean region. Pictures that include a clean region code such clean region using only intra-prediction data or inter-prediction data that references a clean region of another picture. The result is that a decoder can begin decoding a bitstream at a first GDR picture and decode each picture in order. Once the last picture prior to a recovery point is reached, the decoder becomes synchronized and can decode any further pictures by using inter-prediction based on clean usable data. Video coding systems may signal picture order counts of relevant pictures in headers, such as picture/slice headers. Such signaling may include a recovery picture order count value that indicates a difference between the POC of the GDR picture and the POC of the recovery point picture. However, a decoder should determine a POC of the GDR picture in order to determine the POC of the recovery point picture. The present example includes a POC LSB value for the GDR picture. The GDR POC LSB value is included in a header along with the recovery POC value. Further, the GDR POC LSB value is coded into the header prior to the recovery POC value. In this way, the decoder can parse the GDR POC LSB value prior to parsing the recovery POC value. As such, the recovery POC value can be derived immediately rather than being placed in memory to be resolved once the POC for the GDR picture is determined. As such, the present disclosure reduces processor and/or memory resource usage at an encoder and/or a decoder.

Optionally, in any of the preceding aspects, another implementation of the aspect provides, wherein the header associated with the GDR picture is a picture header.

Optionally, in any of the preceding aspects, another implementation of the aspect provides, wherein the POC LBS value is included in the header as a ph_pic_order_cnt_lsb value, and wherein the ph_pic_order_cnt_lsb value specifies a picture order count modulo maximum picture order count LSB for a current picture where the GDR picture is the current picture.

Optionally, in any of the preceding aspects, another implementation of the aspect provides, wherein the recovery picture order count value is included in the header as a recovery_poc_cnt value, and wherein the recovery_poc_cnt value specifies a recovery point of decoded pictures in output order.

Optionally, in any of the preceding aspects, another implementation of the aspect provides, further comprising setting a no output of prior pictures flag in the header when a current picture is the GDR picture.

Optionally, in any of the preceding aspects, another implementation of the aspect provides, wherein the GDR picture includes a region coded according to inter-prediction and a region coded according to intra-prediction.

Optionally, in any of the preceding aspects, another implementation of the aspect provides, further comprising: encoding, by the processor, the GDR picture in a GDR AU; and encoding, by the processor, a BP SE) message associated with the GDR AU into the bitstream, wherein the BP SEI message provides an initial CPB removal delay for initialization of a HRD at a position of the GDR AU in decoding order.

In an embodiment, the disclosure includes a video coding device comprising: a processor, a receiver coupled to the processor, a memory coupled to the processor, and a transmitter coupled to the processor, wherein the processor, receiver, memory, and transmitter are configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a decoder comprising: a receiving means for receiving a bitstream comprising a gradual decoding refresh (GDR) picture, a recovery point picture following the GDR picture in decoding order, and a header associated with the GDR picture, the header including a picture order count (POC) least significant bit (LSB) value coded prior to a recovery picture order count value; a determining means for: determining a POC for the GDR picture based on the POC LSB value; and determining a recovery point picture POC based on the POC for the GDR picture and the recovery picture order count value; a decoding means for decoding the bitstream according to GDR based on the GDR picture and the recovery point picture POC; and a forwarding means for forwarding one or more pictures following the recovery point picture for display as part of a decoded video sequence.

Optionally, in any of the preceding aspects, another implementation of the aspect provides, wherein the decoder is further configured to perform the method of any of the preceding aspects.

In an embodiment, the disclosure includes an encoder comprising: an encoding means for: encoding into a bitstream a GDR picture and a recovery point picture following the GDR picture in decoding order; and encoding into the bitstream a header associated with the GDR picture, the header including a POC LSB value coded prior to a recovery picture order count value; a determining means for determining the POC LSB value of the GDR picture and a recovery picture order count value of the recovery point picture; and a storing means for storing the bitstream for communication toward a decoder.

Optionally, in any of the preceding aspects, another implementation of the aspect provides, wherein the encoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
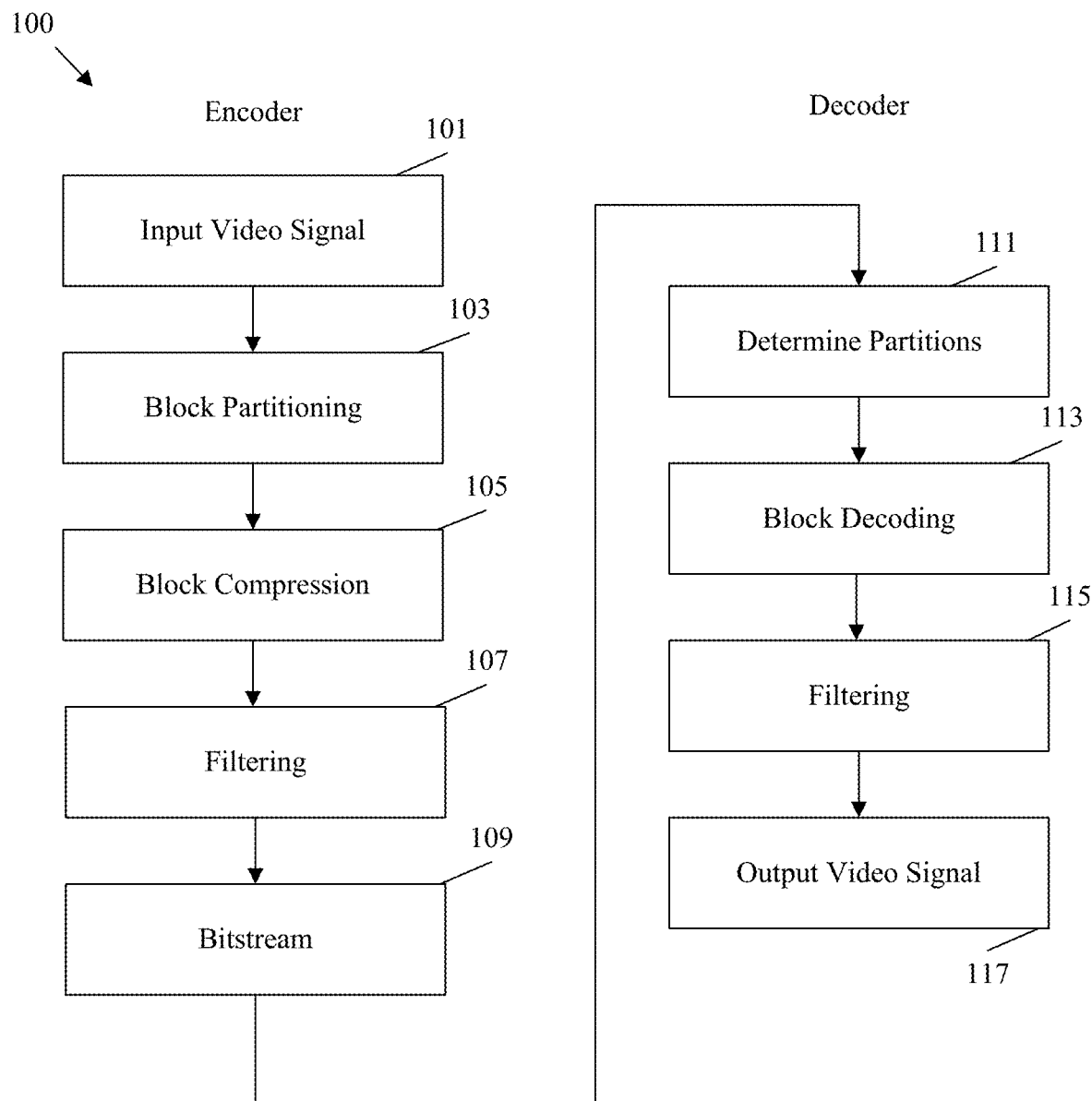
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A bitstream is a sequence of bits including video data that is compressed for transmission between an encoder and a decoder. An encoder is a device that is configured to employ encoding processes to compress video data into a bitstream. A decoder is a device that is configured to employ decoding processes to reconstruct video data from a bitstream for display. A picture is a complete image that is intended for complete or partial display to a user at a corresponding instant in a video sequence. A picture may be partitioned into slices, slices may optionally be partitioned into tiles, slices and/or tiles may be partitioned into coding tree units (CTUs) and/or coding tree blocks (CTBs), and CTUs/CTBs may be partitioned into coding blocks, which can be coded according to prediction mechanisms. An access unit (AU) is a coding unit configured to store a single coded picture and optionally one or more headers containing parameters describing the coding mechanisms employed to code the coded picture. A header is a syntax structure containing syntax elements that apply to a corresponding portion of coded video data. Headers may include picture headers and slice headers. A picture header is a syntax structure containing syntax elements that apply to all slices of a coded picture. A slice header is a part of a coded slice containing the data elements pertaining to all tiles or CTU rows within a tile represented in the slice. Inter-prediction, also known as inter-coding, is a mechanism of coding samples of a current block in a current picture by reference to corresponding samples in a reference block in a reference picture that is different than the current picture. Intra-prediction, also known as intra-coding, is a mechanism of coding samples of a current block in a current picture by reference to corresponding samples in a reference block in the current picture (i.e., the current block and the reference block are in the same picture). GDR is a mechanism of coding a series of pictures that each contain both inter-coded regions and intra-coded regions in order to avoid initializing a coded video sequence with a single picture that is completely intra-coded. A GDR AU is an AU that contains a first GDR picture in a series of GDR related pictures. A recovery point picture is a picture following a GDR series, such that the picture can be completely decoded without reference to data from pictures that precede the first GDR picture in the series. A picture order count (POC) is a variable/value that is associated with each picture and that uniquely identifies the associated picture among all pictures in a coded video sequence. Further, when the associated picture is to be output from a decoded picture buffer (DPB), the POC indicates the position of the associated picture in output order relative to the output order positions of other pictures in the same coded video sequence that are also to be output from the DPB. A recovery POC is the POC of a recovery point picture. A POC least significant bit (LSB) is one or more of the lowest order bits in a POC value. A HRD is a decoder model operating on an encoder that checks the variability of bitstreams produced by an encoding process to verify conformance with specified constraints. A HRD conformance test is a test to determine whether an encoded bitstream complies with a standard, such as VVC. HRD parameters are syntax elements that initialize and/or define operational conditions of an HRD. A supplemental enhancement information (SEI) message is a syntax structure with specified semantics that conveys information that is not needed by the decoding process in order to determine the values of the samples in decoded pictures. A buffering period (BP) SEI message is a SEI message that contains HRD parameters for initializing an HRD to manage a coded picture buffer (CPB). A CPB is a first-in first-out buffer in a HRD that contains coded pictures in decoding order for use during bitstream conformance verification. A decoding order is an order in which syntax elements are processed by a decoding process. A CPB removal delay is period of time that a current picture can remain in the CPB prior to removal. A no output of prior pictures flag is a flag used to indicate that previously decoded pictures in the DPB should not be output.

The following acronyms are used herein, Coding Tree Block (CTB), Coding Tree Unit (CTU), Coding Unit (CU), Clean Random Access (CRA), Coded Video Sequence (CVS), Gradual Decoding Refresh (GDR), Gradual Random Access (GRA), Hypothetical Reference Decoder (HRD), Instantaneous Decoding Refresh (IDR), Joint Video Experts Team (JVET), Motion Constrained Tile Set (MCTS), Maximum Transfer Unit (MTU), Network Abstraction Layer (NAL), Progressive Intra Refresh (PIR), Picture Order Count (POC), Raw Byte Sequence Payload (RBSP), Supplemental Enhancement Information (SEI), Sequence Parameter Set (SPS), Versatile Video Coding (VVC).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-N1001-v3.

Encoders employ many components, such as a HRD. The encoder employs various components to encode a bitstream. The HRD then checks the encoded bitstream to ensure the encoding conforms to standards. For example, an HRD can check a bitstream to verify that a decoder should be capable of decoding the bitstream. Encoders also employ many mechanisms to encode a bitstream. GDR is an example coding mechanism used by an encoder for coding a bitstream. A GDR picture includes a vertical region on intra-prediction coded video data and one or more vertical regions of inter-prediction coded video data. The location of the intra-prediction coded region moves over a series of related pictures creating a clean region. Pictures that include a clean region code such clean regions using only intra-prediction data or inter-prediction data that references a clean region of another picture. This result is that a decoder can begin decoding a bitstream at a first GDR picture and decode each picture in order. Once the last picture prior to a recovery point is reached, the decoder becomes synchronized and can decode any further pictures by using inter-prediction based on clean usable data. HRDs in encoders may be configured to check bitstreams for conformance based on intra random access point (IRAP) pictures that include only intra-prediction data. However, some video coding systems may employ HRDs that are not configured to check bitstreams for conformance when GDR is employed. For example, some HRDs may be configured to begin checking bitstreams for conformance starting from IRAP pictures, and may not check bitstream sequences that include GDR based random access points.

In a first example, disclosed herein are mechanisms for configuring a HRD to perform bitstream conformance checks when the bitstream employs GDR pictures as random access points. The encoder can include a BP SEI message containing HRD parameters when a GDR picture is included in the bitstream. The HRD can read the BP SEI message to obtain initialization parameters and may begin checking the bitstream for conformance starting at the GDR picture that is associated with the BP SEI message. Further, a decoder can check the BP SEI message to verify that the bitstream is conforming, and therefore determine that the bitstream is decodable. As such, including a BP SEI message for a GDR picture supports additional functionality at both an encoder and a decoder. Further, GDR may support reduced spikes in bandwidth during network communication. As such, the presently disclosed mechanisms may reduce processor, memory, and/or network resource usage at both the encoder and the decoder.

Further, video coding systems may signal picture order counts (POCs) of relevant pictures in headers. Such headers may include picture and/or slice headers, depending on the example. In some cases, the signaling may include a recovery POC difference value that indicates a difference between a POC of a GDR picture and a POC of a recovery point picture. However, in order to determine the actual POC value of the recovery point picture, the decoder should first determine a POC of the GDR picture. Accordingly, the decoder stores the recovery POC difference value in memory. The decoder can then determine the recovery point picture POC value once the POC of a GDR picture is received and determined.

In a second example, disclosed herein are mechanisms to increase the efficiency of the coding process when GRD is employed. In an example, a POC LSB value for the GDR picture is signaled in a slice/picture header. The POC LSB value is included in a header along with the recovery picture order count value. Further, the POC LSB value is coded into the header in a position that is prior to the recovery picture order count. In this way, the decoder can parse the POC LSB value prior to parsing the recovery picture order count. As such, the recovery picture order count can be determined immediately rather than being placed in memory to be resolved once the POC for the GDR picture is determined. As such, the present disclosure supports additional functionality at both an encoder and a decoder. Further, the present disclosure reduces processor, memory, and/or network communication resource usage at an encoder and/or a decoder.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
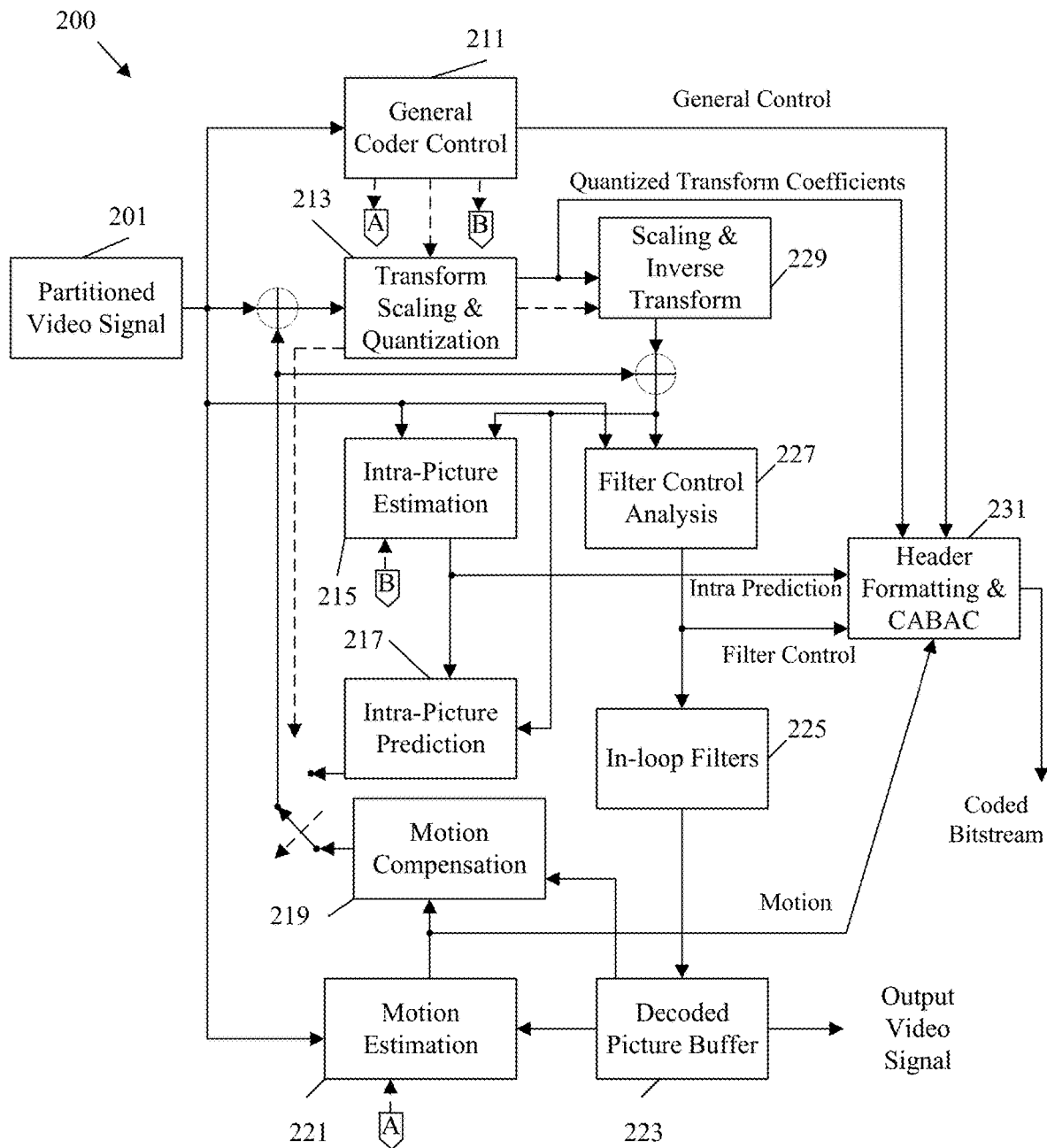
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
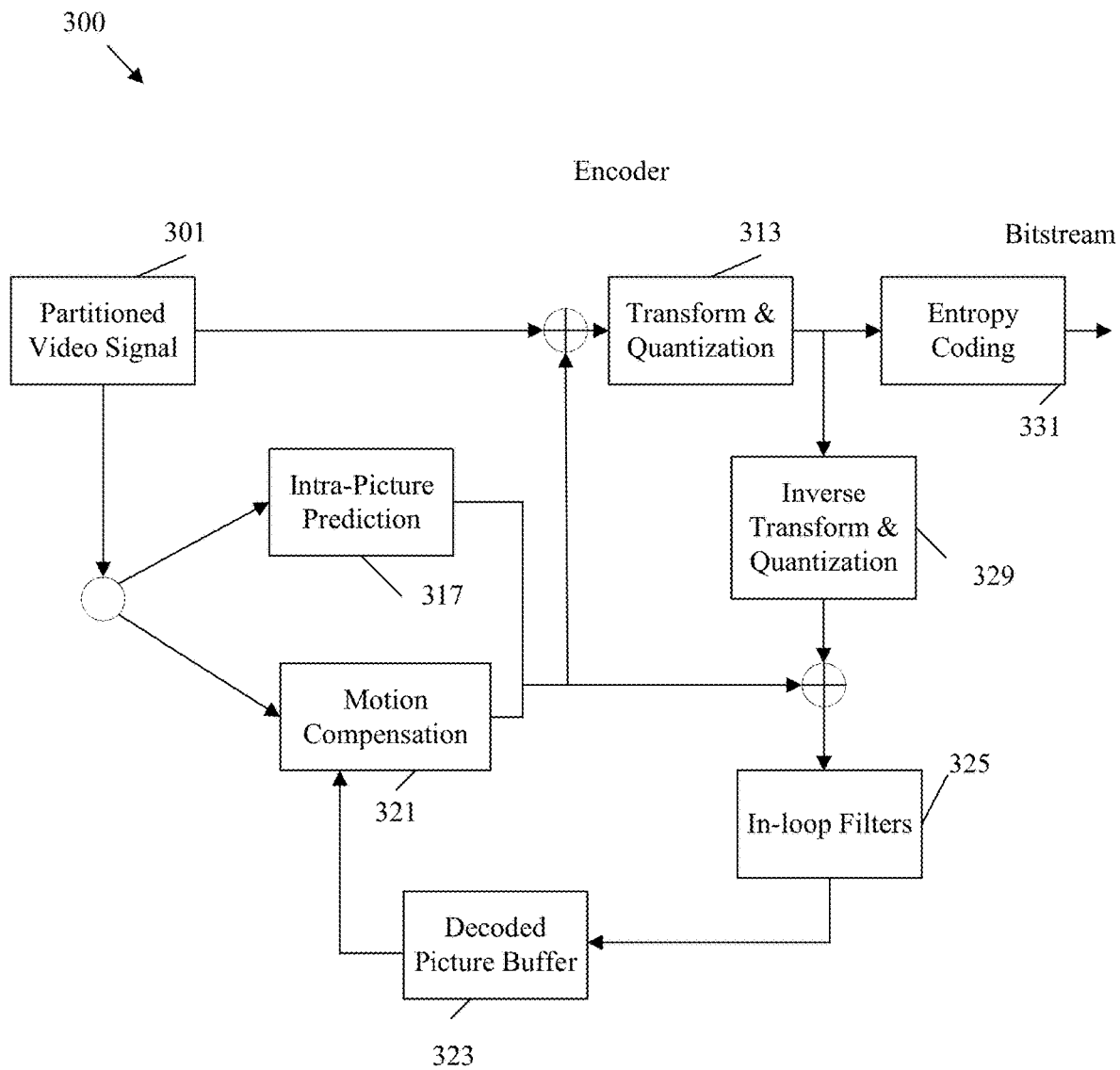
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
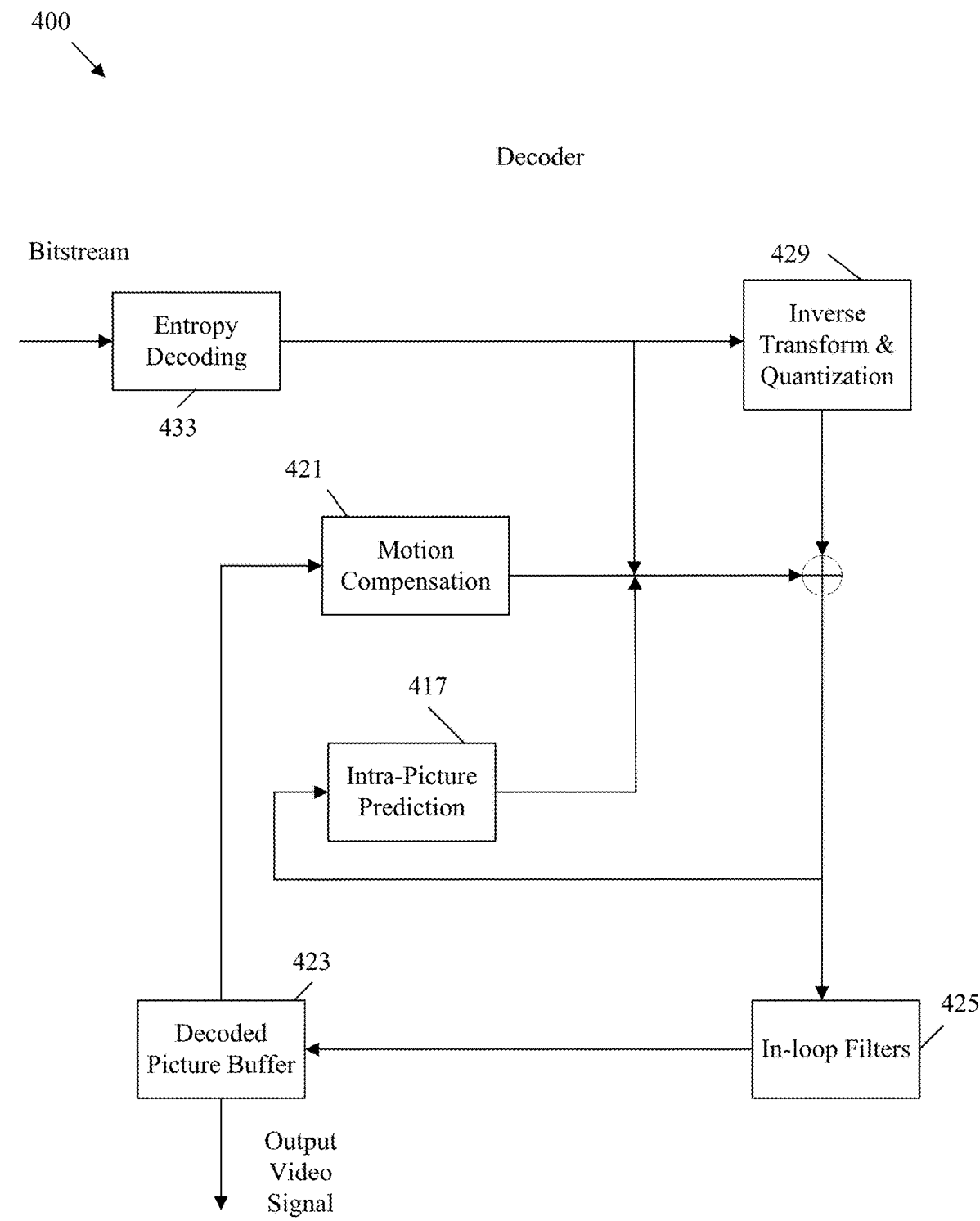
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
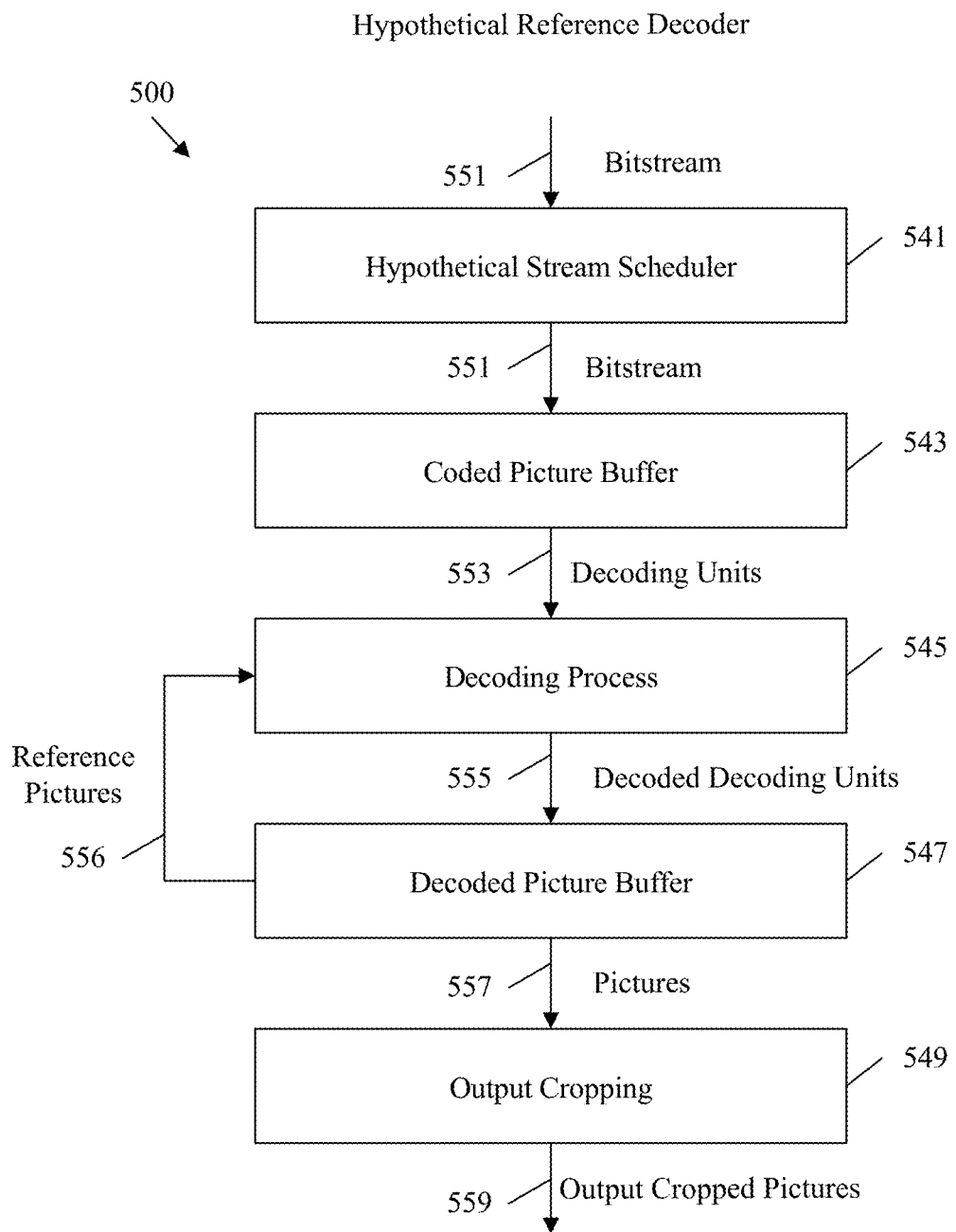
FIG. 5 is a schematic diagram illustrating an example hypothetical reference decoder (HRD).

FIG. 5 is a schematic diagram illustrating an example HRD 500. A HRD 500 may be employed in an encoder, such as codec system 200 and/or encoder 300. The HRD 500 may check the bitstream created at step 109 of method 100 before the bitstream is forwarded to a decoder, such as decoder 400. In some examples, the bitstream may be continuously forwarded through the HRD 500 as the bitstream is encoded. In the event that a portion of the bitstream fails to conform to associated constraints, the HRD 500 can indicate such failure to an encoder to cause the encoder to re-encode the corresponding section of the bitstream with different mechanisms.

The HRD 500 includes a hypothetical stream scheduler (HSS) 541. A HSS 541 is a component configured to perform a hypothetical delivery mechanism. The hypothetical delivery mechanism is used for checking the conformance of a bitstream or a decoder with regards to the timing and data flow of a bitstream 551 input into the HRD 500. For example, the HSS 541 may receive a bitstream 551 output from an encoder and manage the conformance testing process on the bitstream 551. In a particular example, the HSS 541 can control the rate that coded pictures move through the HRD 500 and verify that the bitstream 551 does not contain non-conforming data.

The HSS 541 may forward the bitstream 551 to a CPB 543 at a predefined rate. For purposes of the HRD 500, any units containing coded video in the bitstream 551, such as an AU and/or a NAL unit, may be referred to as decodable units (DU) 553. The CPB 543 is a first-in first-out buffer in the HRD 500. The CPB 543 contains DUs 553 including coded pictures, or subportions thereof (e.g., slices), in decoding order. The CPB 543 stores such pictures for use during bitstream conformance verification.

The CPB 543 forwards the DUs 553 to a decoding process component 545. The decoding process component 545 is a component that conforms to the VVC standard. For example, the decoding process component 545 may emulate a decoder 400 employed by an end user. The decoding process component 545 decodes the DUs 553 at a rate that can be achieved by an example end user decoder. If the decoding process component 545 cannot decode the DUs 553 fast enough to prevent an overflow of the CPB 543, then the bitstream 551 does not conform to the standard and should be re-encoded.

The decoding process component 545 decodes the DUs 553, which creates decoded DUs 555. A decoded DU 555 contains a decoded picture. The decoded DUs 555 are forwarded to a DPB 547. The DPB 547 may be substantially similar to a decoded picture buffer component 223, 323, and/or 423. To support inter-prediction, pictures that are marked for use as reference pictures 556 that are obtained from the decoded DUs 555 are returned to the decoding process component 545 to support further decoding. The DPB 547 outputs the decoded video sequence as a series of pictures 557. The pictures 557 are reconstructed pictures that generally mirror pictures encoded into the bitstream 551 by the encoder.

The pictures 557 are forwarded to an output cropping component 549. The output cropping component 549 is configured to apply a conformance cropping window to the pictures 557. This results in output cropped pictures 559. An output cropped picture 559 is a completely reconstructed picture. Accordingly, the output cropped picture 559 mimics what an end user would see upon decoding the bitstream 551. As such, the encoder can review the output cropped pictures 559 to ensure the encoding is satisfactory.

Figure 6:
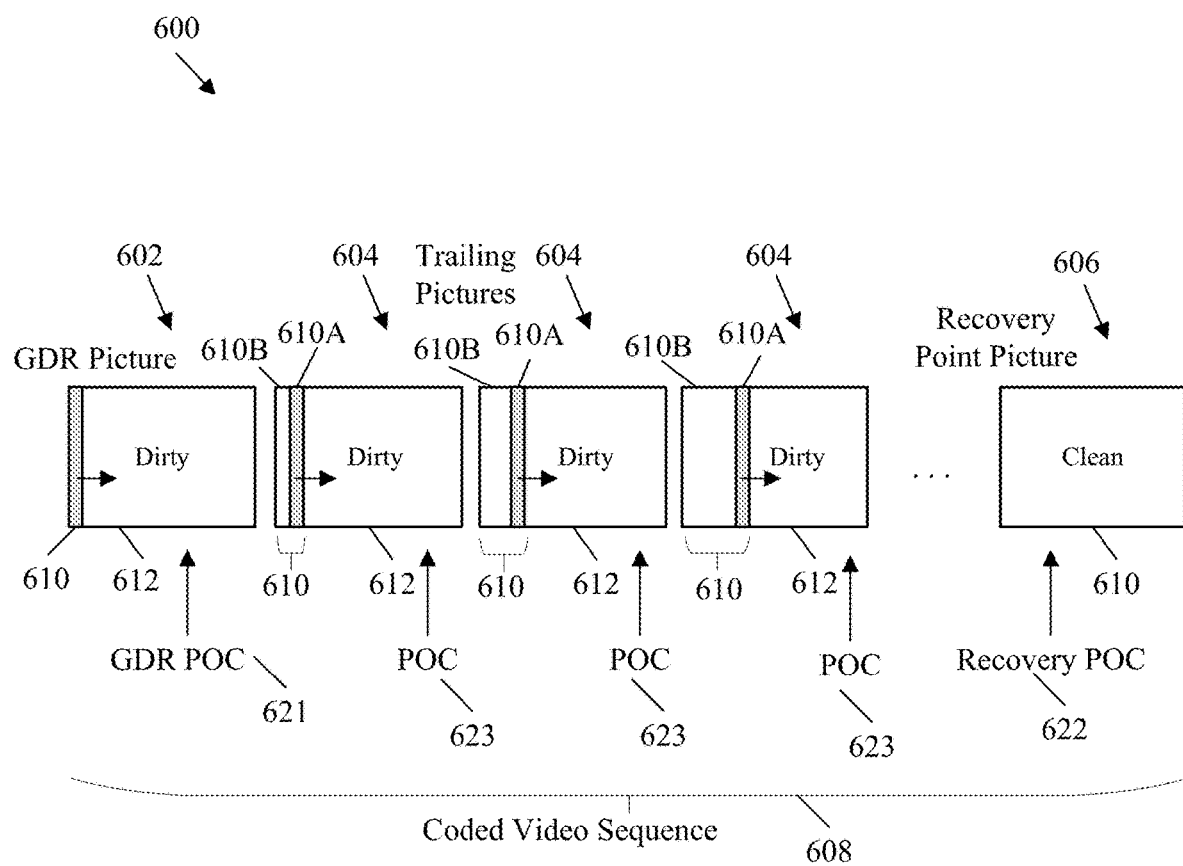
FIG. 6 is a schematic diagram illustrating an example mechanism for performing gradual decoding refresh (GDR) on a video sequence.

FIG. 6 is a schematic diagram illustrating an example mechanism for performing GDR 600 on a video sequence. GDR 600 may be employed on a bitstream encoded by an encoder, such as codec system 200 and/or encoder 300, and decoded by a decoder, such as codec system 200 and/or decoder 400. Further, by employing the techniques described herein, a HRD 500 at an encoder can perform bitstream conformance checks on a bitstream employing GDR 600.

In an embodiment, GDR 600 can be employed to create a random access point in a CVS, such as CVS 608. GDR 600 is a mechanism of coding a series of pictures that each contain both inter-coded regions and intra-coded regions in order to avoid initializing a coded video sequence 608 with a single picture that is completely intra-coded, such as an IRAP picture. Specifically, most pictures in a video sequence are coded according to inter-prediction, and hence are decoded by referencing other pictures. A decoder may be unable to decode an inter-coded picture if the reference picture is not available. GDR 600 provides a mechanism to create a recovery point beyond which all pictures can be correctly decoded.

In an embodiment, a CVS 608 contains a GDR picture 602, one or more trailing pictures 604, and a recovery point picture 606. In an embodiment, the GDR picture 602 is referred to as a CVS starting (CVSS) picture. Further, the GDR picture 602 can be included in a GDR AU, which is an AU that contains a first GDR picture in a series of GDR related pictures. The CVS 608 may be a coded video sequence for every coded layer-wise video sequence (CLVS) in the video bitstream. Notably, the CVS and the CLVS are the same when the video bitstream includes a single layer. The CVS and the CLVS are only different when the video bitstream includes multiple layers. In an embodiment, the trailing pictures 604 may be considered a form of GDR picture since they precede the recovery point picture 606 in a GDR period.

In an embodiment, the GDR picture 602, the trailing pictures 604, and the recovery point picture 606 may define a GDR period in the CVS 608. In an embodiment, a decoding order begins with the GDR picture 602, continues with the trailing pictures 604, and then proceeds to the recovery picture 606. The CVS 608 is a series of pictures (or portions thereof) starting with the GDR picture 602 and includes all pictures (or portions thereof) up to, but not including, the next GDR picture or until the end of the bitstream. The GDR period is a series of pictures that starts with the GDR picture 602 and includes all pictures up to and including the recovery point picture 606. The decoding process for the CVS 608 starts at the GDR picture 602 when the GDR picture 602 is used as a random access point into a video. A random access point is any location in a bitstream where a decoder can begin decoding to obtain usable video data.

As shown in FIG. 6, the GDR 600 operates over a series of pictures starting with the GDR picture 602 and ending with the recovery point picture 606. The GDR picture 602 contains a refreshed/clean region 610 containing blocks that have all be coded using intra-prediction (i.e., intra-predicted blocks) and an un-refreshed/dirty region 612 containing blocks that have all be coded using inter-prediction (i.e., inter-predicted blocks). The intra-predicted blocks can be decoded without reference to other pictures. However, the inter-predicted blocks in the dirty region can only be decoded by referencing pictures that precede the GDR picture 602, and hence can only be decoded when the GDR picture 602 is not used as a random access point.

The trailing picture 604 immediately adjacent to the GDR picture 602 contains a refreshed/clean region 610 having a first region 610A coded using intra-prediction and a second region 610B coded using inter-prediction. The second region 610B is coded by referencing the refreshed/clean region 610 of, for example, a preceding picture within the GDR period of the CVS 608. As shown, the refreshed/clean region 610 of the trailing pictures 604 expands as the coding process moves or progresses in a consistent direction (e.g., from left to right), which correspondingly shrinks the un-refreshed/dirty region 612. Eventually, the recovery point picture 606, which contains only the refreshed/clean region 610, is reached by the coding process. Notably, the second region 610B of the refreshed/clean region 610, which is coded as inter-predicted blocks, may only refer to the refreshed region/clean region 610 in the reference picture. This restriction ensures dirty data is not introduced into the refreshed region/clean region 610.

Accordingly, the recovery point picture 606 is a picture following a GDR series, such that the recovery point picture 606 can be completely decoded without reference to data from pictures that precede the first GDR picture 602 in the series. For example, the recovery point picture 606 may be coded by inter-prediction by referencing any clean region 610 in the preceding pictures. As can be seen from FIG. 6, a decoder may wish to quickly determine which picture is the recovery point picture 606, because the decoder may wish to begin displaying pictures once the recovery point picture 606 is reached. For example, a no output of prior pictures flag may be set in a header, such as a picture or slice header associated with GDR picture 602. When this flag is set, no pictures are output to the user until the recovery point picture 606 is reached. This may prevent the display of GDR pictures 602 and trailing pictures 604 that contain un-refreshed/dirty regions 612 that cannot be properly decoded for display.

This process can be managed by employing POC values. A POC is a variable/value that is associated with each picture and that uniquely identifies the associated picture among all pictures in a CVS 608. Further, when an associated picture is to be output from a DPB, the POC indicates the position of the associated picture in output order relative to the output order positions of other pictures in the same CVS 608 that are also to be output from the DPB. As such, the GDR picture 602 has a GDR POC 621, the trailing pictures 604 have POCs 623, and the recovery point picture 606 has a recovery POC 622. As such, a GDR POC 621 is the POC of a GDR picture 602 and a recovery POC 622 is the POC of a recovery point picture 606. A decoder can use the POC values to determine decoding details related to the GDR period. For example, a header can be employed to indicate a POC LSB associated with the GDR picture 602. A POC LSB is one or more of the lowest order bits in a POC value. A decoder can employ the POC LSB of the GDR picture 602 along with other syntax elements to determine the GDR POC 621. This approach may reduce the number of bits employed to represent the GDR POC 621. The recovery POC 622 can be represented as a difference between the GDR POC 621 and the recovery POC 622. As such, a decoder can determine a POC for the GDR picture 602 based on a POC LSB value from the header. The decoder can then obtain the recovery POC 622 value from the header and resolve the recovery POC 622 value based on the GDR POC 621 for the GDR picture 602. The recovery POC 622 value, once resolved/determined, indicates a POC for the recovery point picture 606. The decoder can then begin displaying reconstructed pictures starting from the recovery point picture 606.

Figure 7:
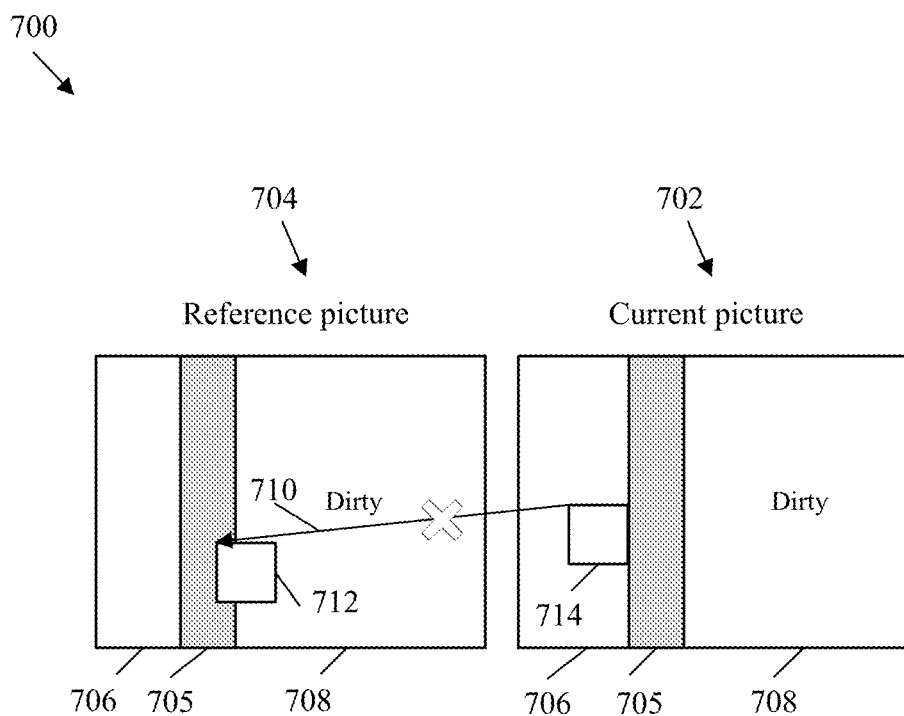
FIG. 7 is a schematic diagram illustrating an undesirable motion search.

FIG. 7 is a schematic diagram illustrating an undesirable motion search 700 when using an encoder restriction to support GDR 600. As shown, the motion search 700 depicts a current picture 702 and a reference picture 704. The current picture 702 and the reference picture 704 each include a refreshed region 706 coded with intra-prediction, a refreshed region 705 coded with inter-prediction, and an unrefreshed region 708. The refreshed region 705, the refreshed region 706, and the unrefreshed region 708 are similar to the the first region 610A of the refreshed/clean region 610, the second region 610B of the refreshed/clean region 610, and the un-refreshed/dirty region 612, respectively, in FIG. 6.

During a motion search process, the encoder is constrained or prevented from selecting any motion vector 710 that points to a reference block 712 that includes samples located outside the refreshed region 705-706. This occurs even when the reference block 712 provides the best rate-distortion cost criteria when predicting the current block 714 in the current picture 702. However, employing this constraint ensures that the refreshed region 705-706 does not reference any dirty data, and hence does not become un-decodable when an associated GDR picture is used as a random access point.

Figure 8:
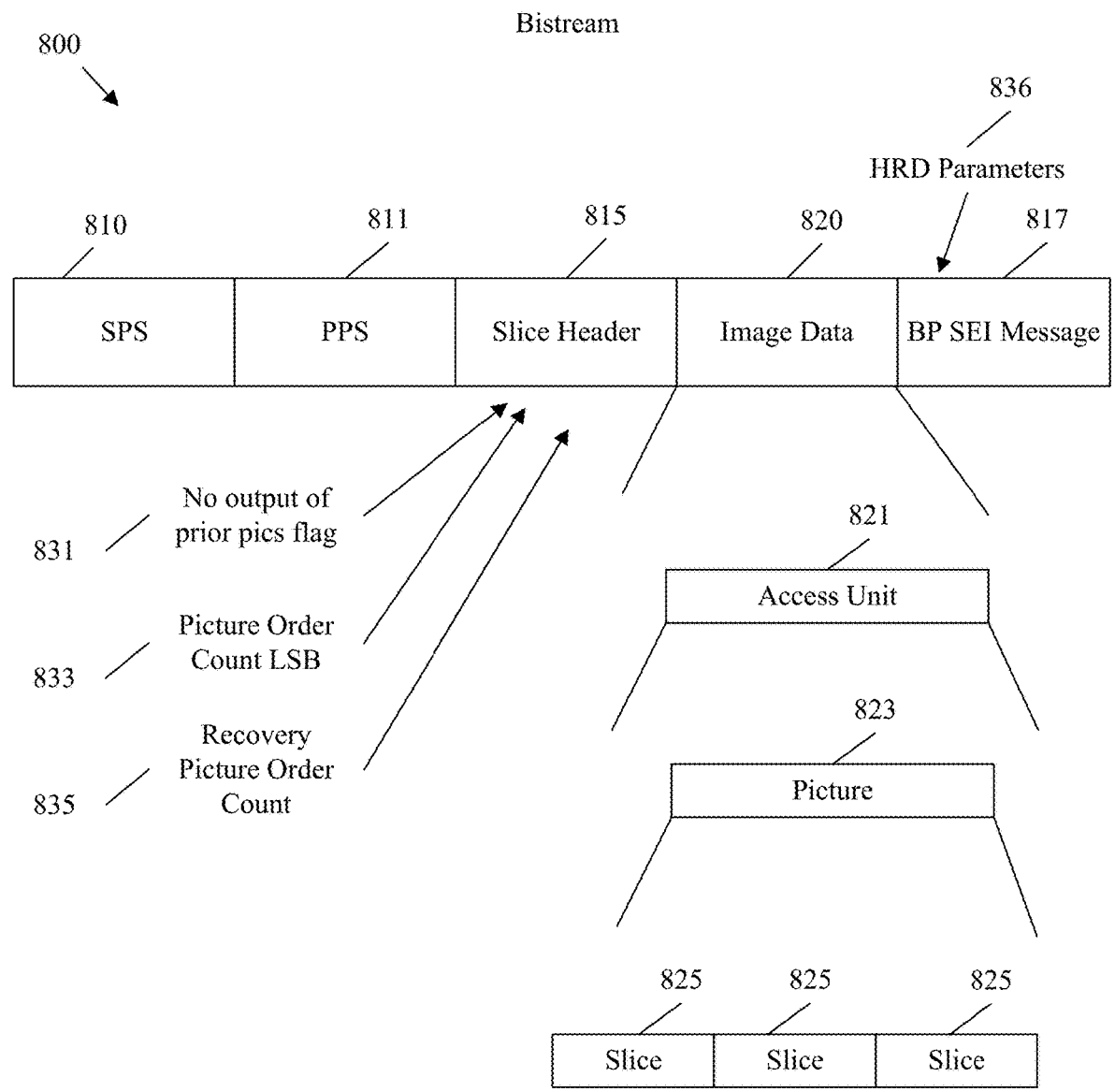
FIG. 8 is a schematic diagram illustrating an example bitstream for use in initializing a HRD when GDR is employed.

FIG. 8 is a schematic diagram illustrating an example bitstream 800 for use in initializing a HRD, such as HRD 500, when GDR, such as GDR 600 is employed. For example, the bitstream 800 can be generated by a codec system 200 and/or an encoder 300 for decoding by a codec system 200 and/or a decoder 400 according to method 100.

The bitstream 800 includes a SPS 810, a plurality of picture parameter sets (PPSs) 811, a plurality of slice headers 815, and image data 820. An SPS 810 contains sequence data common to all the pictures in the coded video sequence contained in the bitstream 800. Such data can include picture sizing, bit depth, coding tool parameters, bit rate restrictions, etc. The PPS 811 contains parameters that apply to an entire picture. Hence, each picture in the video sequence may refer to a PPS 811. It should be noted that, while each picture refers to a PPS 811, a single PPS 811 can contain data for multiple pictures in some examples. For example, multiple similar pictures may be coded according to similar parameters. In such a case, a single PPS 811 may contain data for such similar pictures. The PPS 811 can indicate coding tools available for slices in corresponding pictures, quantization parameters, offsets, etc. The slice header 815 contains parameters that are specific to each slice in a picture. Hence, there may be one slice header 815 per slice in the video sequence. The slice header 815 may contain slice type information, POCs, reference picture lists, prediction weights, tile entry points, deblocking parameters, etc. It should be noted that a slice header 815 may also be referred to as a tile group header in some contexts. It should be noted that in some examples, a bitstream 800 may also include a picture header, which is a syntax structure that contains parameters that apply to all slices in a single picture. For this reason, a picture header and a slice header 815 may be used interchangeably in some contexts. For example, certain parameters may be moved between the slice header 815 and a picture header depending on whether such parameters are common to all slices in a picture.

The image data 820 contains video data encoded according to inter-prediction and/or intra-prediction as well as corresponding transformed and quantized residual data. For example, a video sequence includes a plurality of pictures 823. A picture 823 is a complete image that is intended for complete or partial display to a user at a corresponding instant in a video sequence. A picture 823 may be contained in a single AU 821. An AU 821 is a coding unit configured to store a single coded picture 823 and optionally one or more headers, such as slice headers 815, containing parameters describing the coding mechanisms employed to code the coded picture 823. A picture 823 contains one or more slices 825. A slice 825 may be defined as an integer number of complete tiles or an integer number of consecutive complete CTU rows (e.g., within a tile) of a picture 823 that are exclusively contained in a single NAL unit. The slices 825 are further divided into CTUs and/or coding tree blocks (CTBs). A CTU is a group of samples of a predefined size that can be partitioned by a coding tree. A CTB is a subset of a CTU and contains luma components or chroma components of the CTU. The CTUs/CTBs are further divided into coding blocks based on coding trees. The coding blocks can then be encoded/decoded according to prediction mechanisms.

As noted above, some video coding systems may not be configured to perform HRD 500 when the bitstream 800 includes pictures 823 coded according to GDR 600. This is because HRD 500 may be configured to begin performing conformance tests at IRAP pictures. A BP SEI message 817 may be employed to address this issue. The BP SEI message 817 may be associated with a GDR AU. For example, a BP SEI message 817 may be included in the bitstream 800 for each AU 821 that contains a GDR picture (e.g., the first picture in a GDR period). A SEI message is a syntax structure with specified semantics that conveys information that is not needed by the decoding process in order to determine the values of the samples in decoded pictures. Hence, an SEI message is employed to signal parameters that are not directly related to decoding the bitstream 800. A BP SEI message 817 is a SEI message that contains HRD parameters 836 for initializing an HRD to manage a CPB, such as CPB 543. A CPB may retain/buffer pictures for a specified period. As such, the BP SEI message 817 may be configured to specify the buffering period at the CPB. The HRD parameters 836 include any parameters that support the initialization of the HRD. For example, the HRD parameters 836 may include an initial CPB removal delay. A CPB removal delay is period of time that a current picture can remain in the CPB prior to removal. The CPB removal delay may be employed for initialization of the HRD at a position of the GDR AU in decoding order. As such, the BP SEI message 817 may be employed to initialize the HRD at a GDR picture, and hence supports application of bitstream conformance tests when a bitstream 800 contains GDR pictures. Further, the HRD parameters 836 in the BP SEI message 817 may indicate to a decoder that the bitstream has been subjected to conformance tests. Accordingly, the HRD parameters 836 in the BP SEI message 817 may indicate to a decoder that the decoder is capable of decoding the bitstream 800.

The bitstream 800 may also include other mechanisms to support the use of GDR. For example, a slice header 815 or a corresponding picture header may include a no output of prior pics flag 831. The no output of prior pics flag 831 may be set in the header for a GDR picture, which is contained in a GDR AU. The no output of prior pics flag 831 can be set to indicate to the decoder that pictures in the GDR period should not be output until the recovery picture is reached. The recovery picture can then be displayed without displaying partially decoded pictures that are reconstructed in part based on dirty data.

Further, the bitstream 800 may include a POC LSB value 833 and a recovery POC value 835, for example in a slice header 815 or a corresponding picture header. The POC LSB value 833 contains one or more of the lowest order bits in a POC value. A POC LSB value 833 may be associated with a GDR picture, and hence may indicate the LSB of the POC for the GDR picture. In example, the POC LSB value 833 can be included in the header as a ph_pic_order_cnt_lsb value. The ph_pic_order_cnt_lsb value may specify a POC modulo maximum POC LSB for a current picture when the current picture is a GDR picture. The recovery POC value 835 indicates the POC of a recovery point picture associated with the GDR picture. For example, the recovery POC value 835 can be included in the same header as the POC LSB value 833. Further, the recovery POC value 835 can be signaled as a recovery POC count (recovery_poc_cnt) value. The recovery_poc_cnt value specifies a recovery point of decoded pictures in output order as a difference in POC count between the GDR POC and the recovery point picture POC. Further, the POC LSB value 833 may be listed in the header prior to the recovery POC value 835. In this way, the decoder can parse the header to obtain the POC LSB value 833 and determine the GDR POC. The decoder can parse the header to obtain the recovery POC value 835. Since the GDR POC has already been determined based upon the POC LSB value 833, the recovery POC value 835 can be resolved immediately so that the recovery point picture POC can be determined. This allows the decoder to avoid storing an unresolved recovery POC value 835 in memory until the POC LSB value 833 for the GDR picture can be parsed and resolved. As such, the bitstream 800 contains various mechanisms that support increased GDR functionality, for example with respect to a HRD and/or with respect to a decoder. As such, the mechanisms described with respect to bitstream 800 may increase the functionality of an encoder and/or decoder. Further, the mechanisms described with respect to bitstream 800 may support increased coding efficiency and/or support the reduction of processor, memory, and/or network communication resources at the encoder and/or the decoder.

The preceding information is now described in more detail herein below. Video coding systems implementing high efficiency video coding (HEVC) may employ a plurality of IRAP pictures. Specifically, in HEVC, IDR, broken link access (BLA), and CRA pictures together are considered as IRAP pictures. Video coding systems that employ VVC may employ IDR and CRA pictures as IRAP pictures. An IRAP picture may provide the following functionalities/benefits. The presence of an IRAP picture indicates that a decoding process can start from that picture. This functionality supports a random access feature in which a decoding process can start at a position in a bitstream that is not necessarily the beginning of a bitstream as long as an IRAP picture is present at that position. The presence of an IRAP picture may also refresh the decoding process such that pictures coded after the IRAP picture in decoding order, excluding random access skipped leading (RASL) pictures, are coded without any reference to pictures prior to the IRAP picture. Accordingly, any coding error that may occur when decoding pictures prior to the IRAP picture may not propagate through the IRAP picture and into pictures that follow the IRAP picture in decoding order.

IRAP pictures provide various functionalities at the cost of penalties to compression efficiency. For example, the presence of an IRAP picture causes surge in bit-rate. This penalty to the compression efficiency has two causes. First, an IRAP picture is an intra-predicted picture. Therefore, more bits may be employed to represent an IRAP than other inter-predicted pictures. Second, the presence of an IRAP picture may break temporal prediction. This is because an IRAP picture may refresh the decoding process and remove previous reference pictures from the DPB. As such, the coding efficiency of pictures that follow the IRAP picture in decoding order may be reduced because such pictures have fewer reference pictures to select from when performing inter-prediction coding.

Among the picture types that are considered IRAP pictures, IDR pictures may employ different signaling and derivation when compared to other picture types. Some of the differences are as follows. For signaling and derivation of a POC value of an IDR picture, the most significant bit (MSB) part of the POC may not be derived from a previous key picture, but may instead be set equal to zero. For signaling information used for reference picture management, a slice header of an IDR picture may not contain information to assist in reference picture management. Other picture types such as CRA and trailing pictures may contain information such as a reference picture set (RPS) or reference picture list information to support a reference picture marking process. The reference picture marking process is a process to determine the status of reference pictures in the DPB as either used for reference or unused for reference. However, for IDR pictures such information may not be signaled because the presence of IDR indicates that the decoding process should mark all reference pictures in the DPB as unused for reference.

Leading pictures, when present, are associated with an IRAP picture. Leading pictures are pictures that follow an associated IRAP picture in decoding order but precede the IRAP picture in presentation/output order. Depending on the coding configuration and picture referencing structure, leading pictures are further identified into two types. The first type is the leading pictures that may not be decoded correctly when the decoding process starts at an associated IRAP picture. Such pictures are known as random access skipped leading (RASL) pictures. RASL pictures may not be decodable in this case because RASL pictures are coded with reference to pictures that precede the IRAP picture in decoding order. The second type is a leading picture that can be decoded correctly even when the decoding process starts at an associated IRAP picture. These pictures are known as random access decodable leading (RADL) pictures. RADL pictures can be decoded because RADL pictures are coded without referencing, directly or indirectly, pictures that precede the IRAP picture in decoding order. Some video coding systems employ constraints such that, RASL pictures should precede RADL pictures in output order when the RASL and RADL pictures are associated with the same IRAP picture.

IRAP pictures and leading pictures are assigned different NAL unit types to support identification by system level applications. For example, a video splicer may be configured to determine coded picture types without reviewing detailed syntax elements in the coded bitstream. For example, a video splicer may identify IRAP pictures from non-IRAP pictures and identify leading pictures, including determining RASL and RADL pictures, from trailing pictures. Trailing pictures are pictures that are associated with an IRAP picture and follow the IRAP picture in output order. A picture is associated with a particular IRAP picture when the picture follows the particular IRAP picture in decoding order and precedes any other IRAP picture in decoding order. Accordingly, assigning IRAP and leading pictures distinct NAL unit types support such applications.

Some example NAL unit types for picture types are as follows. A BLA with leading picture (BLA_W_LP) is a NAL unit of a Broken Link Access (BLA) picture that may be followed by one or more leading pictures in decoding order. A BLA with RADL (BLA_W_RADL) is a NAL unit of a BLA picture that may be followed by one or more RADL pictures but no RASL picture in decoding order. A BLA with no leading picture (BLA_N_LP) is a NAL unit of a BLA picture that is not followed by leading picture in decoding order. An IDR with RADL (IDR_W_RADL) is a NAL unit of an IDR picture that may be followed by one or more RADL pictures but no RASL picture in decoding order. An IDR with no leading picture (IDR_N_LP) is a NAL unit of an IDR picture that is not followed by leading picture in decoding order. A CRA is a NAL unit of a CRA picture that may be followed by leading pictures, such as RASL pictures, RADL pictures, or both. A RADL is a NAL unit of a RADL picture. A RASL is a NAL unit of a RASL picture.

For low delay applications, avoiding IRAP pictures may be beneficial due to the relatively larger bit-rate requirement of IRAP picture coding as compared to non-IRAP picture coding as such larger bit-rate requirement causes increased latency and/or delays. However, totally avoiding the use of random access points may not be possible in all low delay applications. For example, conversational applications such as multi-party teleconferencing may need to provide regular points in which a new user can join a teleconference.

Progressive intra refresh (PIR) is an example mechanism that may be employed to provide random access points into a bitstream without using IRAP pictures. This approach may allow a new user to join a multi-party teleconferencing application while avoiding the increased peak in bit-rate associated with IRAP. PIR may also be referred to as gradual decoding refresh (GDR) and/or gradual random access (GRA). FIG. 6 illustrates an example mechanism for performing GDR. A GDR technique operates over multiple pictures starting from a GDR picture. The GDR picture includes one region where all coded blocks in the region are coded as intra-predicted blocks. This region may be referred to as a refreshed region/clean region. The blocks in the rest of the GDR picture may be coded as inter-predicted blocks. This region may be referred to as an un-refreshed/dirty region. In the subsequent pictures following the GDR picture, the region coded with intra-predicted blocks moves in a consistent direction (e.g., from left to right). This mechanism shrinks the dirty region which includes the inter-predicted blocks. For each subsequent picture, the region that is collocated with clean regions from previous pictures can be coded according to inter-prediction, which increases the size of the clean/refreshed region. The clean region of a current picture may only use inter-prediction to reference blocks from a clean region in a reference picture.

Video systems employing HEVC may support GDR non-normatively by using a recovery point SEI message and a region refresh information SEI message. Such SEI messages may not define how GDR is performed, but may provide a mechanism to indicate the first and the last pictures in the GDR period (e.g., in the recovery point SEI message) and a region that is refreshed (e.g., in the region refresh information SEI message). GDR may be performed by employing constraint intra-prediction (CIP) and encoder constraints for motion vectors. CIP can be used to code the intra-coded region because CIP ensures the intra-coded region does not reference samples from the un-refreshed region. CIP may cause coding performance degradations because associated constraints are applied to both intra-coded blocks in the refreshed region and all intra-coded blocks in the picture. Encoder constraints for motion vectors may be applied by restricting the encoder from using any samples in the reference pictures that are located outside of the refreshed region. Such a constraint may result in a non-optimal motion search. FIG. 7 illustrates an example non-optimal motion search resulting from using an encoder restriction to support GDR. During the motion search process the encoder is prevented from selecting any motion vector that refers to any samples of a reference block which are located outside the refreshed region. This condition is maintained even when that reference block is the best reference block according to a rate-distortion cost criteria.

An example implementation of GDR based on the use of CIP and encoder constraints approach can be summarized as follows. An intra-prediction mode is forced on a coding unit on column basis. Constrained intra-prediction is enabled to ensure reconstruction of the intra-predicted coding unit. Motion vectors are constrained to point within the refreshed area while taking into account an additional margin, such as six pixels, to avoid filters error spreading. Former reference pictures may be removed when re-looping the intra-predicted column. Another example implementation of GDR may be employed to indicate the pictures used as the first and the last pictures in the GDR period. This example can be summarized as follows. A NAL unit with NAL unit type recovery point indication can be employed as a non-video coding layer (VCL) NAL unit. The payload of the NAL unit contains a syntax element to specify information which can be used to derive the POC value of the last picture in the GDR period. The access unit that contains the non-VCL NAL unit with type recovery point indication may be referred to as a Recovery Point Begin (RBP) access unit. The picture in the RBP access unit is called a RBP picture. The decoding process can start from the RBP AU. When the decoding starts from a RBP AU, none of the pictures in the GDR period except the last picture are output for display.

In an example implementation, video coding systems employing VVC to implement GRA may employ the following elements to enable a coded video sequence (CVS) to start with a GRA picture that is not completely intra-coded. A gra_enabled_flag in the SPS may specify whether GRA pictures may be present or not. A GRA_NUT is a NAL unit type that indicates a GRA picture. A recovery_poc_cnt in a slice header may specify that the corresponding picture is a recovery picture, and hence the picture starts a new CVS and the recovery picture and subsequence pictures may be correctly decoded based on the pictures in the GRA period. The CVS may start from a GRA picture in a manner similar to starting a CVS after a CRA picture.

The preceding aspects contain certain problems. For example, VVC implementations employing GRA pictures may not support specifying HRD parameters and defining HRD conformance operations for bitstreams containing GRA pictures. Consequently, the decoding capability requirements for such bitstreams may be unclear, for example for bitstreams starting with a GRA picture.

In general, this disclosure describes methods for supporting the specification of bitstream conformance mechanisms for video bitstreams including GDR pictures. For example, such support may be accomplished through the definition of mechanisms to manage the HRD for such bitstreams. The description of the techniques employed herein is based on VVC implementations, but may also apply to other video codec specifications.

One or more of the abovementioned problems may be solved as follows. For example, the present disclosure includes an approach that specifies HRD parameters and allows for defining HRD conformance operations, which can be performed for bitstreams containing GRA pictures. For example, a NalHrdBpPresentFlag can be set equal to one or a VclHrdBpPresentFlag can be set equal to one to indicate when HRD parameters are present for a CVS. In such a case, a buffering period SEI message may be associated with each GRA access unit. Further, the buffering period SEI message may contain the HRD parameters. Accordingly, HRD parameters are made available for GRA access units, and the HRD operation can initialize at any GRA access unit. For example, a video bitstream containing a plurality of GRA access units can each contain a GRA picture. The bitstream can be decoded by a decoder. Each of the GRA access units can be associated with a buffering period SEI message. The decoder can decode the video bitstream starting from one of the GRA access units based on at least the buffering period SEI message associated with the GRA access unit. In another example, an encoder can encode a video bitstream. For example, the encoder can encode a plurality of GRA pictures, by encoding each GRA picture into one access unit in the bitstream. For each of the GRA pictures, the encoder can encode an associated buffering period SEI message. One or more example implementations are included below.

An example general slice header syntax is as follows.

|  | Descriptor |
| --- | --- |
| slice_header( ) { | |
| ... | |
| if( NalUnitType = = IDR_W_RADL \|\| | |
| NalUnitType = = IDR_N_LP \|\| | |
| NalUnitType = = CRA_NUT \|\| | |
| NalUnitType = = GRA_NUT ) | |
| no_output_of_prior_pics_flag | u(1) |
| ... | |

An example end of sequence RBSP semantics is as follows. When present, the end of sequence RBSP specifies that the current access unit is the last access unit in the coded video sequence in decoding order and the next subsequent access unit in the bitstream in decoding order (if any) is an IRAP or GRA access unit. The syntax content of the string of data bits (SODB) and RBSP for the end of sequence RBSP are empty.

An example general slice header semantics is as follows. When present, the value of each of the slice header syntax elements slice_pic_parameter_set_id, slice_pic_order_cnt_lsb, no_output_of_prior_pics_flag, and slice_temporal_mvp_enabled_flag may be the same in all slice headers of a coded picture. A no_output_of_prior_pics_flag may affect the output of previously-decoded pictures in the decoded picture buffer after the decoding of a coded video sequence start (CVSS) picture that is not the first picture in the bitstream.

An example mechanism for removal of pictures from the DPB before decoding of the current picture is as follows. When the current picture is a CVSS picture that is not picture zero, the following ordered steps may be applied.

The variable NoOutputOfPriorPicsFlag can be derived for the decoder under test as follows. If the value of pic_width_in_luma_samples, pic_height_in_luma_samples, chroma_format_idc, separate_colour_plane_flag, bit_depth_luma_minus8, bit_depth_chroma_minus8 or sps_max_dec_pic_buffering_minus1[HighestTid] derived from the active SPS is different from the value of pic_width_in_luma_samples, pic_height_in_luma_samples, chroma_format_idc, separate_colour_plane_flag, bit_depth_luma_minus8, bit_depth_chroma_minus8 or sps_max_dec_pic_buffering_minus1[HighestTid], respectively, derived from the SPS active for the preceding picture, NoOutputOfPriorPicsFlag may (but should not) be set to one by the decoder under test, regardless of the value of no_output_of_prior_pics_flag. Although setting NoOutputOfPriorPicsFlag equal to no_output_of_prior_pics_flag may be preferred under these conditions, the decoder under test is allowed to set NoOutputOfPriorPicsFlag to one in this case. Otherwise, NoOutputOfPriorPicsFlag may be set equal to no_output_of_prior_pics_flag. The value of NoOutputOfPriorPicsFlag as derived for the decoder under test is applied for the HRD, such that when the value of NoOutputOfPriorPicsFlag is equal to one, all picture storage buffers in the DPB are emptied without output of the pictures they contain, and the DPB fullness is set equal to zero.

An example bitstream conformance is as follows. The first coded picture in a bitstream should be an IRAP picture (e.g., an IDR picture or a CRA picture) or a GRA picture.

An example output and removal of pictures from the DPB is as follows. If the current picture is a CVSS picture that is not picture zero, the following ordered steps may be applied. The variable NoOutputOfPriorPicsFlag may be derived for the decoder under test as follows. If the value of pic_width_in_luma_samples, pic_height_in_luma_samples, chroma_format_idc, separate_colour_plane_flag, bit_depth_luma_minus8, bit_depth_chroma_minus8 or sps_max_dec_pic_buffering_minus1[HighestTid] derived from the active SPS is different from the value of pic_width_in_luma_samples, pic_height_in_luma_samples, chroma_format_idc, separate_colour_plane_flag, bit_depth_luma_minus8, bit_depth_chroma_minus8 or sps_max_dec_pic_buffering_minus1[HighestTid], respectively, derived from the SPS active for the preceding picture, NoOutputOfPriorPicsFlag may (but should not) be set to one by the decoder under test, regardless of the value of no_output_of_prior_pics_flag. Although setting NoOutputOfPriorPicsFlag equal to no_output_of_prior_pics_flag is preferred under these conditions, the decoder under test is allowed to set NoOutputOfPriorPicsFlag to one in this case. Otherwise, NoOutputOfPriorPicsFlag may be set equal to no_output_of_prior_pics_flag.

The value of NoOutputOfPriorPicsFlag derived for the decoder under test may be applied for the HRD as follows. If NoOutputOfPriorPicsFlag is equal to one, all picture storage buffers in the DPB may be emptied without output of the pictures they contain and the DPB fullness may be set equal to zero. Otherwise (NoOutputOfPriorPicsFlag is equal to zero), all picture storage buffers containing a picture that is marked as not needed for output and unused for reference may be emptied (without output) and all non-empty picture storage buffers in the DPB may be emptied by repeatedly invoking a bumping process and the DPB fullness may be set equal to zero.

An example buffering period SEI message semantics is as follows. The presence of buffering period SEI messages may be specified as follows. If a NalHrdBpPresentFlag is equal to one or a VclHrdBpPresentFlag is equal to one, the following may apply for each access unit in the CVS. If the access unit is an IRAP or GRA access unit, a buffering period SEI message applicable to the operation point may be associated with the access unit. Otherwise, if the access unit contains a notDiscardablePic, a buffering period SEI message applicable to the operation point may or may not be associated with the access unit. Otherwise, the access unit may not be associated with a buffering period SEI message applicable to the operation point. Otherwise (NalHrdBpPresentFlag and VclHrdBpPresentFlag are both equal to zero), no access unit in the CVS may be associated with a buffering period SEI message. When the current picture contains a buffering period SEI message and concatenation_flag is equal to one, the cpb_removal_delay_minus1 for the current picture may not be used. The above-specified constraint can, under some circumstances, enable splicing bitstreams (that use referencing structures) by changing the value of concatenation_flag from zero to one in the buffering period SEI message for an IRAP or GRA picture at the splicing point. When concatenation_flag is equal to zero, the above-specified constraint enables the decoder to check whether the constraint is satisfied as a way to detect the loss of the picture prevNonDiscardablePic.

An example picture timing SEI message semantics is as follows. For pictures that are not output by the bumping process because they precede, in decoding order, a CVSS picture that has no_output_of_prior_pics_flag equal to one or is inferred to be equal to 1, the output times derived from dpb_output_delay may be increasing with increasing value of PicOrderCntVal relative to all pictures within the same CVS.

Figure 9:
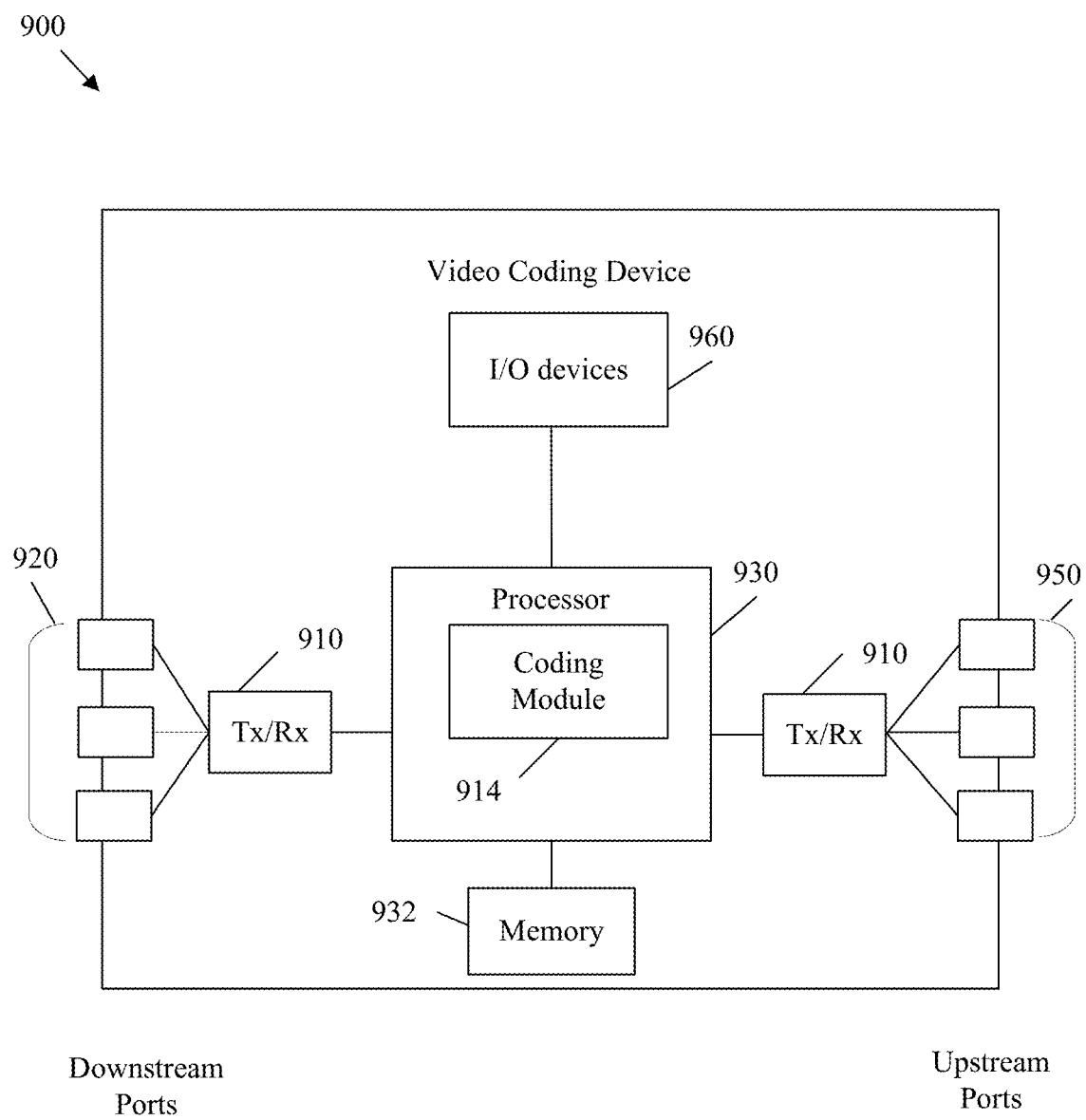
FIG. 9 is a schematic diagram of an example video coding device.

FIG. 9 is a schematic diagram of an example video coding device 900. The video coding device 900 is suitable for implementing the disclosed examples/embodiments as described herein. The video coding device 900 comprises downstream ports 920, upstream ports 950, and/or transceiver units (Tx/Rx) 910, including transmitters and/or receivers for communicating data upstream and/or downstream over a network. The video coding device 900 also includes a processor 930 including a logic unit and/or central processing unit (CPU) to process the data and a memory 932 for storing the data. The video coding device 900 may also comprise electrical, optical-to-electrical (OE) components, electrical-to-optical (EO) components, and/or wireless communication components coupled to the upstream ports 950 and/or downstream ports 920 for communication of data via electrical, optical, or wireless communication networks. The video coding device 900 may also include input and/or output (I/O) devices 960 for communicating data to and from a user. The I/O devices 960 may include output devices such as a display for displaying video data, speakers for outputting audio data, etc. The I/O devices 960 may also include input devices, such as a keyboard, mouse, trackball, etc., and/or corresponding interfaces for interacting with such output devices.

The processor 930 is implemented by hardware and software. The processor 930 may be implemented as one or more CPU chips, cores (e.g., as a multi-core processor), field-programmable gate arrays (FPGAs), application specific integrated circuits (ASICs), and digital signal processors (DSPs). The processor 930 is in communication with the downstream ports 920, Tx/Rx 910, upstream ports 950, and memory 932. The processor 930 comprises a coding module 914. The coding module 914 implements the disclosed embodiments described herein, such as methods 100, 1000, and 1100, which may employ GDR 600 and/or a bitstream 800. The coding module 914 may also implement any other method/mechanism described herein. Further, the coding module 914 may implement a codec system 200, an encoder 300, a decoder 400, and/or a HRD 500. For example, the coding module 914 may be associated with a BP SEI message with a GDR picture. Further, the coding module 914 can position a POC LSB value prior to a recovery picture order count value in a header associated with a picture. Hence, coding module 914 causes the video coding device 900 to provide additional functionality and/or coding efficiency when coding video data. As such, the coding module 914 improves the functionality of the video coding device 900 as well as addresses problems that are specific to the video coding arts. Further, the coding module 914 effects a transformation of the video coding device 900 to a different state. Alternatively, the coding module 914 can be implemented as instructions stored in the memory 932 and executed by the processor 930 (e.g., as a computer program product stored on a non-transitory medium).

The memory 932 comprises one or more memory types such as disks, tape drives, solid-state drives, read only memory (ROM), random access memory (RAM), flash memory, ternary content-addressable memory (TCAM), static random-access memory (SRAM), etc. The memory 932 may be used as an over-flow data storage device, to store programs when such programs are selected for execution, and to store instructions and data that are read during program execution.

Figure 10:
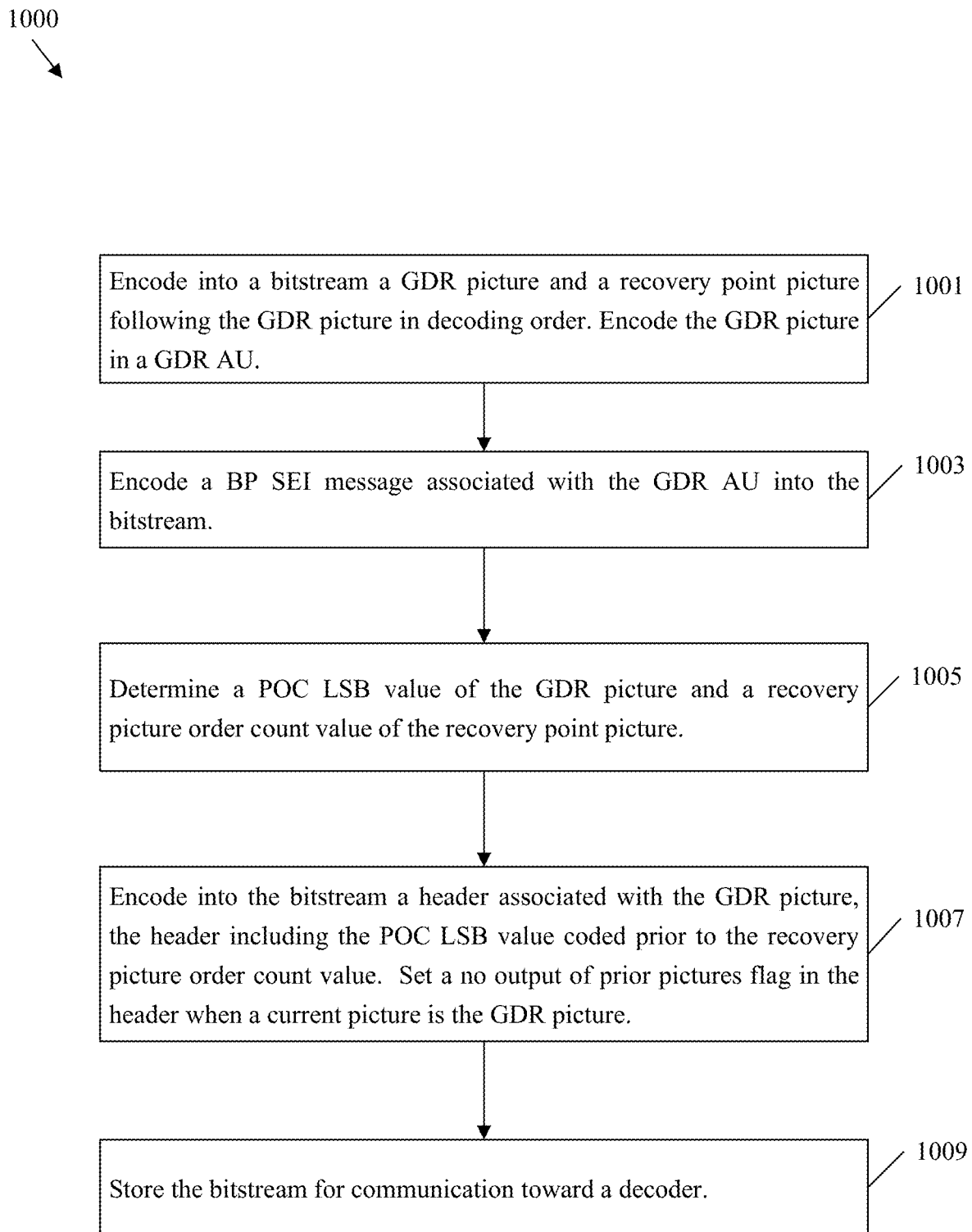
FIG. 10 is a flowchart of an example method of signaling a recovery point picture picture order count (POC) when encoding a video sequence employing GDR into a bitstream.

FIG. 10 is a flowchart of an example method 1000 of signaling a recovery point picture POC when encoding a video sequence employing GDR, such as GDR 600, into a bitstream, such as bitstream 800. Method 1000 may be employed by an encoder, such as a codec system 200, an encoder 300, and/or a video coding device 900 when performing method 100. Such an encoder may also employ a HRD 500.

Method 1000 may begin when an encoder receives a video sequence including a plurality of pictures and determines to encode that video sequence into a bitstream, for example based on user input. At step 1001, the encoder encodes, into a bitstream, a GDR period including a GDR picture, such as GDR picture 602, and one or more trailing pictures, such as trailing pictures 604, as described in FIG. 6. Specifically, the GDR picture and the associated trailing pictures each include one or more regions coded according to inter-prediction, such as second region 610B and/or un-refreshed/dirty region 612, and a region coded according to intra-prediction, such as first region 610A. In some examples, the regions coded according to inter-prediction and the region coded according to intra-prediction may each be taller than they are wide as shown in FIG. 6. The encoder also encodes a recovery point picture, such as recovery point picture 606, into the bitstream. The recovery point picture follows both the GDR picture and the associated trailing pictures in the GDR period in decoding order. The GDR picture may be encoded into a GDR AU. The trailing pictures and the recovery point picture may be encoded into trailing AUs.

At step 1003, the encoder can encode a BP SEI message associated with the GDR AU into the bitstream. The BP SEI message provides an initial CPB removal delay and/or other HRD parameters. These parameters may be employed for initialization of a HRD, such as HRD 500, at a position of the GDR AU in the bitstream in decoding order.

At step 1005, the encoder determines a POC LSB value of the GDR picture. The POC LSB value may be used to identify the GDR picture from other pictures in the bitstream. The decoder also determines a recovery picture order count value that identifies the recovery point picture.

In some examples, the recovery picture order count value indicates the location of the recovery point picture relative to the GDR picture. For example, the recovery picture order count value may indicate a difference between the POC of the GDR picture and the POC of the recovery point picture. It should be noted that a difference between the recovery picture POC and the GDR POC may be a smaller value that the recovery picture POC. As such, signaling the recovery picture POC as a difference value increases coding efficiency by compressing the signaled data.

At step 1007, the encoder encodes a header associated with the GDR picture into the bitstream. Further, the encoder encodes the POC LSB value and the recovery picture order count value into the header. Specifically, the POC LSB value coded is encoded prior to the recovery picture order count value in the header. In this way, the decoder can parse the header and resolve the GDR POC based on the POC LSB prior to parsing the recovery picture order count value. In this way, the recovery picture order count value can be resolved immediately when the recovery picture order count value is parsed. This may be more efficient than storing the recovery picture order count value in memory until the GDR POC can be determined. In various examples, the header associated with the GDR picture is a picture header and/or a slice header. Accordingly, the POC LSB value and the recovery picture order count value may be included in a picture header and/or a slice header. In an example, the POC LBS value is included in the header as a picture header picture order count LSB (ph_pic_order_cnt_lsb) value. The ph_pic_order_cnt_lsb value specifies a picture order count modulo maximum picture order count LSB for a current picture where the GDR picture is the current picture. In an example, the recovery picture order count value is included in the header as a recovery POC count (recovery_poc_cnt) value. The recovery_poc_cnt value specifies a recovery point of decoded pictures in output order. In an example, the encoder can also set a no output of prior pictures flag in the header when a current picture is the GDR picture. This flag instructs the decoder to not output the GDR picture and the associated trailing pictures prior to the recovery point picture in order to avoid outputting pictures with dirty data that may not be completely decoded.

At step 1009, the encoder can store the bitstream for communication toward a decoder.

Figure 11:
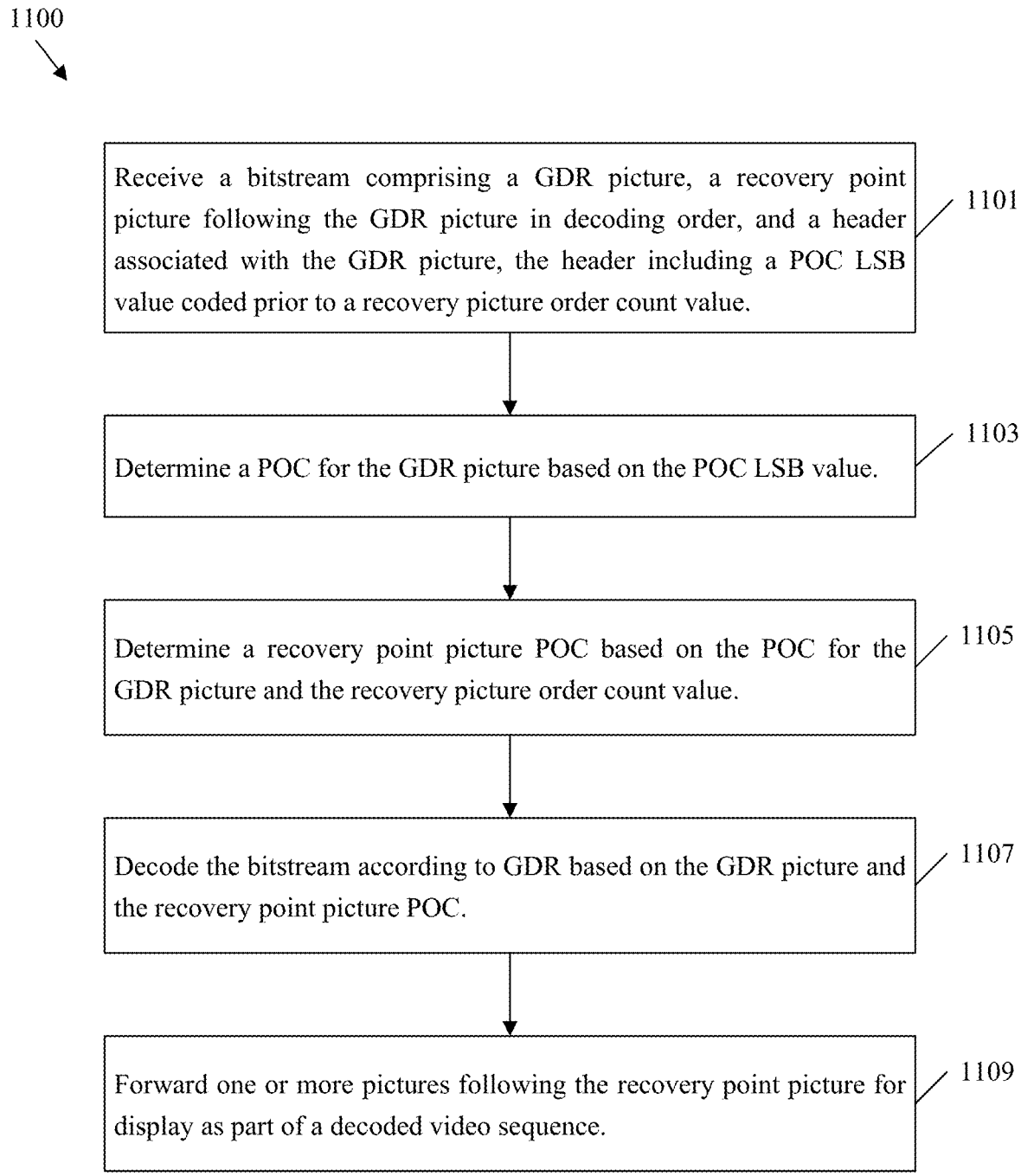
FIG. 11 is a flowchart of an example method of decoding a video sequence employing GDR from a bitstream based on a signaled recovery point picture POC.

FIG. 11 is a flowchart of an example method 1100 of decoding a video sequence employing GDR, such as GDR 600, from a bitstream, such as bitstream 800, based on a signaled recovery point picture POC. Method 1100 may be employed by a decoder, such as a codec system 200, a decoder 400, and/or a video coding device 900 when performing method 100.

Method 1100 may begin when a decoder begins receiving a bitstream of coded data representing a video sequence, for example as a result of method 1000 in an encoder employing a HRD 500. At step 1101, the decoder receives a bitstream. The bitstream comprises a GDR period including a GDR picture, such as GDR picture 602, and one or more trailing pictures, such as trailing pictures 604, as described in FIG. 6. Specifically, the GDR picture and the associated trailing pictures each include one or more regions coded according to inter-prediction, such as second region 610B and/or un-refreshed/dirty region 612, and a region coded according to intra-prediction, such as first region 610A. In some examples, the regions coded according to inter-prediction and the region coded according to intra-prediction may each be taller than they are wide as shown in FIG. 6. The bitstream also comprises a recovery point picture, such as recovery point picture 606, into the bitstream. The recovery point picture follows both the GDR picture and the associated trailing pictures in the GDR period in decoding order. The GDR picture may be encoded into a GDR AU. The trailing pictures and the recovery point picture may be encoded into trailing AUs.

The bitstream may also comprise a header associated with the GDR picture. In various examples, the header associated with the GDR picture is a picture header and/or a slice header. The header includes a POC LSB value and a recovery picture order count value. Specifically, the POC LSB value coded is coded prior to the recovery picture order count value in the header. In this way, the decoder can parse the header and resolve the GDR POC based on the POC LSB prior to parsing the recovery picture order count value. In this way, the recovery picture order count value can be resolved immediately when the recovery picture order count value is parsed. This may be more efficient than storing the recovery picture order count value in memory until the GDR POC can be determined. In an example, the POC LBS value is included in the header as a ph_pic_order_cnt_lsb value. The ph_pic_order_cnt_lsb value specifies a picture order count modulo maximum picture order count LSB for a current picture where the GDR picture is the current picture. In an example, the recovery picture order count value is included in the header as a recovery_poc_cnt value. The recovery_poc_cnt value specifies a recovery point of decoded pictures in output order. In some examples, a no output of prior pictures flag is set in the header when a current picture is the GDR picture. This flag instructs the decoder to not output the GDR picture and the associated trailing pictures prior to the recovery point picture in order to avoid outputting pictures with dirty data that may not be completely decoded.

In some examples, the bitstream further comprises a BP SEI message associated with the GDR AU. The BP SEI message provides an initial CPB removal delay for initialization of a HRD at a position of the GDR AU in decoding order. Further, the decoder can determine that the bitstream is conforming, and therefore decodable, based on the presence of the BP SEI message. For example, the presence of the BP SEI message in the bitstream indicates an HRD has performed a conformance test on the bitstream.

At step 1103, the decoder determines a POC for the GDR picture based on the POC LSB value. For example, the header may also contain a value that contains the most significant bits (MSB) of the POC for the current picture. The decoder can hence determine the POC for the GDR based on the MSB and the LSB.

At step 1105, the decoder determines a recovery point picture POC based on the POC for the GDR picture and the recovery picture order count value. For example, the recovery picture order count value may include a difference between the GDR POC and the recovery point picture POC.

At step 1107, the decoder decodes the bitstream according to GDR based on the GDR picture and the recovery point picture POC. For example, the bitstream may employ the GDR POC and the recovery point picture POC to obtain the corresponding coded pictures and associated trailing pictures from the bitstream. The decoder can then decode the GDR picture, the associated trailing pictures, and the recovery point picture according to GDR. The decoder can also suppress the GDR pictures and trailing pictures prior to the recovery point picture based on the no output of prior pictures flag.

At step 1109, the decoder can forward one or more pictures following the recovery point picture for display as part of a decoded video sequence.

Figure 12:
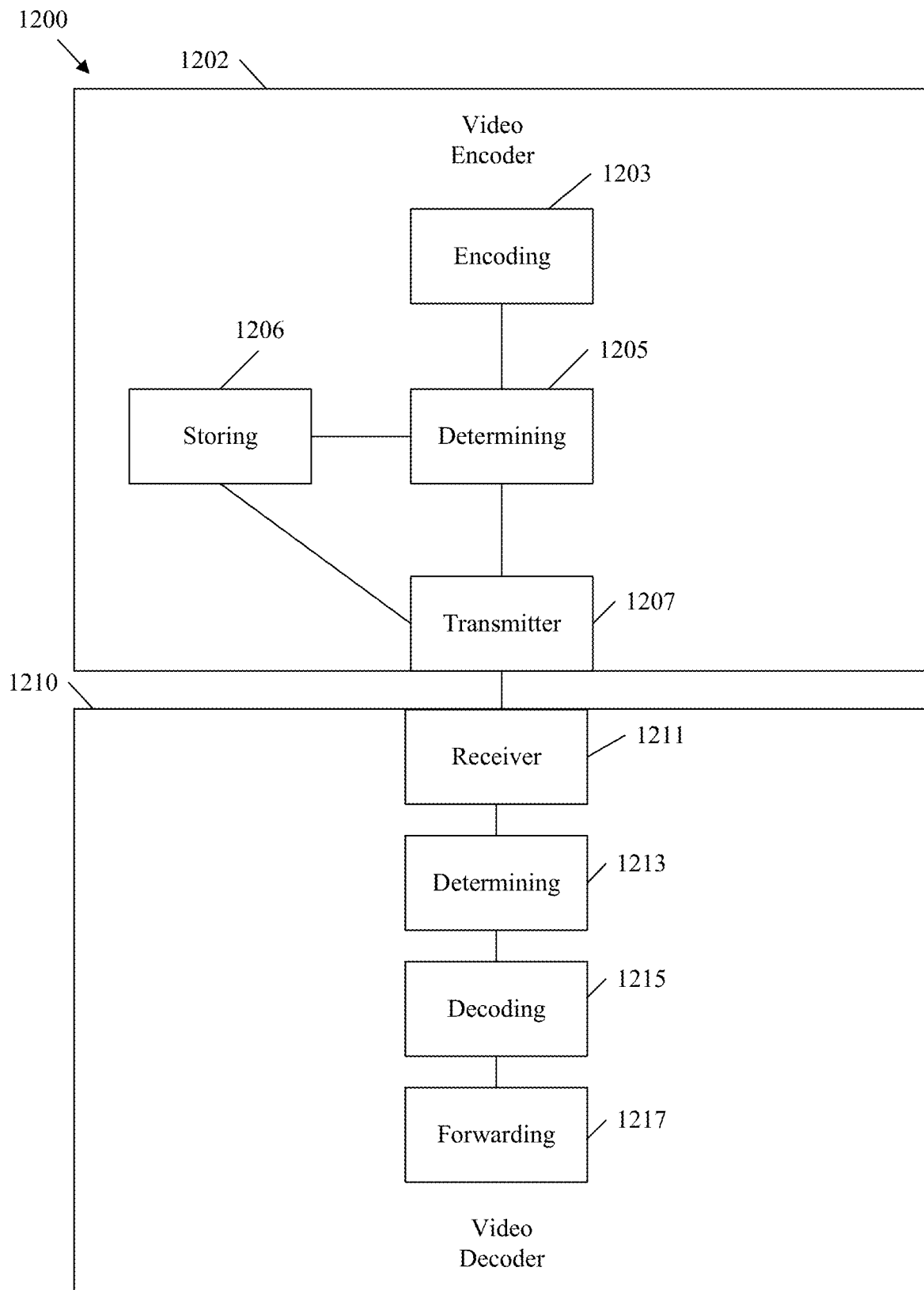
FIG. 12 is a schematic diagram of an example system for coding a video sequence employing GDR into a bitstream based on a signaled recovery point picture POC.

FIG. 12 is a schematic diagram of an example system 1200 for coding a video sequence employing GDR, such as GDR 600, into a bitstream, such as bitstream 800, based on a signaled recovery point picture POC. System 1200 may be implemented by an encoder and a decoder such as a codec system 200, an encoder 300, a decoder 400, and/or a video coding device 900, which may employ a HRD 500. Further, system 1200 may be employed when implementing method 100, 1000, and/or 1100.

The system 1200 includes a video encoder 1202. The video encoder 1202 comprises an encoding module 1203 for encoding into a bitstream a GDR picture and a recovery point picture following the GDR picture in decoding order. The encoding module 1203 is further for encoding into the bitstream a header associated with the GDR picture, the header including a POC LSB value coded prior to a recovery picture order count value. The video encoder 1202 further comprises a determining module 1205 for determining the POC LSB value of the GDR picture and a recovery picture order count value of the recovery point picture. The video encoder 1202 further comprises a storing module 1206 for storing the bitstream for communication toward a decoder. The video encoder 1202 further comprises a transmitting module 1207 for transmitting the bitstream toward a decoder for reconstruction into a video sequence. The video encoder 1202 may be further configured to perform any of the steps of method 1000.

The system 1200 also includes a video decoder 1210. The video decoder 1210 comprises a receiving module 1211 for receiving a bitstream comprising a GDR picture, a recovery point picture following the GDR picture in decoding order, and a header associated with the GDR picture, the header including a POC LSB value coded prior to a recovery picture order count value. The video decoder 1210 comprises a determining module 1213 for determining a POC for the GDR picture based on the POC LSB value. The determining module 1213 is further for determining a recovery point picture POC based on the POC for the GDR picture and the recovery picture order count value. The video decoder 1210 further comprises a decoding module 1215 for decoding the bitstream according to GDR based on the GDR picture and the recovery point picture. The video decoder 1210 further comprises a forwarding module 1217 for for forwarding one or more pictures following the recovery point picture for display as part of a decoded video sequence. The video decoder 1210 may be further configured to perform any of the steps of method 1100.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method for storing a coded video bitstream, the method comprising:
    obtaining a bitstream comprising a gradual decoding refresh (GDR) picture and a recovery point picture following the GDR picture in decoding order,
    wherein the bitstream further comprises a header associated with the GDR picture, the header including a picture order count (POC) least significant bit (LSB) value of the GDR picture coded prior to a recovery picture order count value of the recovery point picture, wherein the POC LSB value is included in the header as a ph_pic_order_cnt_lsb value, and wherein the ph_pic_order_cnt_lsb value specifies a picture order count modulo maximum picture order count LSB for a current picture; and
    storing the bitstream in at least one storage medium.

2. The method of claim 1, wherein the header associated with the GDR picture is a picture header.

3. The method of claim 1, wherein the recovery picture order count value is included in the header as a recovery_poc_cnt value, and wherein the recovery_poc_cnt value specifies a recovery point of decoded pictures in output order.

4. The method of claim 1, wherein a no output of prior pictures flag is set when the current picture is the GDR picture.

5. The method of claim 1, wherein the GDR picture includes a region coded according to inter-prediction and a region coded according to intra-prediction.

6. The method of claim 1, wherein the GDR picture is contained in a GDR access unit (AU), wherein the bitstream further comprises a buffering period (BP) supplemental enhancement information (SEI) message associated with the GDR AU, and wherein the BP SEI message provides an initial coded picture buffer (CPB) removal delay for initialization of a hypothetical reference decoder (HRD) at a position of the GDR AU in decoding order.

7. An encoder comprising:
    a processor configured to:
        encode into a bitstream a gradual decoding refresh (GDR) picture and a recovery point picture following the GDR picture in decoding order;

determine a picture order count (POC) least significant bit (LSB) value of the GDR picture and a recovery picture order count value of the recovery point picture; and encode into the bitstream a header associated with the GDR picture, the header including the POC LSB value coded prior to the recovery picture order count value, wherein the POC LSB value is included in the header as a ph_pic_order_cnt_lsb value, and wherein the ph_pic_order_cnt_lsb value specifies a picture order count modulo maximum picture order count LSB for a current picture; and a memory coupled to the processor and configured to store the bitstream.

8. The encoder of claim 7, wherein the header associated with the GDR picture is a picture header.

9. The encoder of claim 7, wherein the recovery picture order count value is included in the header as a recovery_poc_cnt value, and wherein the recovery_poc_cnt value specifies a recovery point of decoded pictures in output order.

10. The encoder of claim 7, wherein the processor is further configured to set a no output of prior pictures flag when the current picture is the GDR picture.

11. The encoder of claim 7, wherein the GDR picture includes a region coded according to inter-prediction and a region coded according to intra-prediction.

12. The encoder of claim 7, wherein the processor is further configured to:

encode the GDR picture in a GDR access unit (AU); and encode a buffering period (BP) supplemental enhancement information (SEI) message associated with the GDR AU into the bitstream, wherein the BP SEI message provides an initial coded picture buffer (CPB) removal delay for initialization of a hypothetical reference decoder (HRD) at a position of the GDR AU in decoding order.

13. A non-transitory computer readable medium comprising a computer program product for use by a video coding device, the computer program product comprising computer executable instructions stored on the non-transitory computer readable medium such that when executed by a processor cause the video coding device to:

receive a bitstream comprising a gradual decoding refresh (GDR) picture, a recovery point picture following the GDR picture in decoding order, and a header associated with the GDR picture, the header including a picture order count (POC) least significant bit (LSB) value coded prior to a recovery picture order count value, wherein the POC LSB value is included in the header as a ph_pic_order_cnt_lsb value, and wherein the ph_pic_order_cnt_lsb value specifies a picture order count modulo maximum picture order count LSB for a current picture;

determine a POC for the GDR picture;

determine a recovery point picture POC based on the POC for the GDR picture and the recovery picture order count value; and decode the bitstream based on the GDR picture and the recovery point picture POC.

14. The non-transitory computer readable medium of claim 13, wherein the header associated with the GDR picture is a picture header.

15. The non-transitory computer readable medium of claim 13, wherein the recovery picture order count value is included in the header as a recovery_poc_cnt value, and wherein the recovery_poc_cnt value specifies a recovery point of decoded pictures in output order.

16. The non-transitory computer readable medium of claim 13, wherein a no output of prior pictures flag is set when the current picture is the GDR picture.

17. The non-transitory computer readable medium of claim 13, wherein the GDR picture includes a region coded according to inter-prediction and a region coded according to intra-prediction.

18. The non-transitory computer readable medium of claim 13, wherein the GDR picture is contained in a GDR access unit (AU), wherein the bitstream further comprises a buffering period (BP) supplemental enhancement information (SEI) message associated with the GDR AU, and wherein the BP SEI message provides an initial coded picture buffer (CPB) removal delay for initialization of a hypothetical reference decoder (HRD) at a position of the GDR AU in decoding order.

* * * * *